(12) United States Patent
Golfetto

(10) Patent No.: US 10,981,216 B2
(45) Date of Patent: Apr. 20, 2021

(54) METHOD OF PRODUCING A METAL FORM CONTAINING DISPERSED AEROGEL PARTICLES IMPREGNATED WITH POLYMERS

(71) Applicant: Michael Golfetto, Farmington Hills, MI (US)

(72) Inventor: Michael Golfetto, Farmington Hills, MI (US)

(73) Assignee: META-DRY LLC, Farmington Hills, MI (US)

( * ) Notice: Subject to any disclaimer, the term of this patent is extended or adjusted under 35 U.S.C. 154(b) by 71 days.

(21) Appl. No.: 15/966,421

(22) Filed: Apr. 30, 2018

(65) Prior Publication Data
US 2019/0143400 A1 May 16, 2019

Related U.S. Application Data

(63) Continuation-in-part of application No. PCT/US2017/030216, filed on Apr. 28, 2017, which is a continuation-in-part of application No. PCT/US2016/059611, filed on Oct. 29, 2016.

(60) Provisional application No. 62/248,162, filed on Oct. 29, 2015, provisional application No. 62/248,194, filed on Oct. 29, 2015, provisional application No. 62/248,194, filed on Oct. 29, 2015, provisional application No. 62/248,162, filed on Oct. 29, 2015.

(51) Int. Cl.
| | |
|---|---|
| *B01D 12/00* | (2006.01) |
| *C08J 9/26* | (2006.01) |
| *B01D 3/00* | (2006.01) |
| *F26B 5/06* | (2006.01) |
| *B22C 7/02* | (2006.01) |
| *C01B 33/158* | (2006.01) |
| *B29C 67/20* | (2006.01) |
| *B01J 13/00* | (2006.01) |
| *B22D 25/00* | (2006.01) |
| *B29C 35/16* | (2006.01) |
| *C08J 9/22* | (2006.01) |
| *B82Y 30/00* | (2011.01) |

(52) U.S. Cl.
CPC .......... *B22C 7/026* (2013.01); *B01D 3/00* (2013.01); *B01D 12/00* (2013.01); *B01J 13/0065* (2013.01); *B01J 13/0091* (2013.01); *B22D 25/005* (2013.01); *B29C 35/16* (2013.01); *B29C 67/202* (2013.01); *B29C 67/207* (2013.01); *C01B 33/1585* (2013.01); *C08J 9/22* (2013.01); *F26B 5/06* (2013.01); *B82Y 30/00* (2013.01); *C08J 2205/026* (2013.01); *Y02P 20/54* (2015.11)

(58) Field of Classification Search
CPC ....... B22C 7/026; B29C 67/202; B29C 35/16; B29C 67/207; B01J 13/0065; B01J 13/0091; B22D 25/005; B22D 25/00; C08J 9/22; C08J 2205/026; B01D 3/00; B01D 12/00; C01B 33/1585; F26B 5/06; B82Y 30/00; Y02P 20/544

See application file for complete search history.

(56) References Cited

U.S. PATENT DOCUMENTS

| | | |
|---|---|---|
| 3,025,680 A | 3/1962 | Brosse et al. |
| 3,113,032 A | 12/1963 | Wayne |
| 5,156,895 A | 10/1992 | Martin |
| 5,190,987 A | 3/1993 | Parkinson |
| 5,275,796 A | 1/1994 | Tillotson et al. |
| 5,443,746 A | 8/1995 | Harris et al. |
| 5,851,947 A | 12/1998 | Hair et al. |
| 6,627,669 B2 | 9/2003 | Mukherjee et al. |
| 6,704,192 B2 | 3/2004 | Pekala |
| 6,887,563 B2 | 5/2005 | Frank et al. |
| 7,071,287 B2 | 7/2006 | Rhine et al. |
| 7,074,880 B2 | 7/2006 | Rhine et al. |
| 7,078,359 B2 | 7/2006 | Stepanian et al. |
| 7,258,873 B2 | 8/2007 | Truong-Le et al. |
| 7,560,062 B2 | 7/2009 | Gould et al. |

(Continued)

FOREIGN PATENT DOCUMENTS

| | | |
|---|---|---|
| CN | 1490582 A | 4/2004 |
| DE | 102008022754 A1 | 11/2009 |

(Continued)

OTHER PUBLICATIONS

Kang et al, Nanotube Aerogel Sheet Flutter for Actuation, Power Generation, and Infrasound Detection, Nature, Aug. 18, 2014, available at: https://www.nature.com/articles/srep06105.

(Continued)

*Primary Examiner* — Kara B Boyle
(74) *Attorney, Agent, or Firm* — Dickinson Wright PLLC

(57) ABSTRACT

A method of producing a metal form containing dispersed aerogel particles impregnated with polymers comprising a method of impregnating an aerogel with polymers, placing the aerogel impregnated with polymers within a dissolved polymer, cooling the dissolved polymer to create a polymer form with dispersed aerogel particles impregnated with polymers, adding molten metal to the polymer form, vaporizing the polymer form, replacing the polymer form with molten metal, and cooling the molten metal to yield a metal form containing dispersed aerogel particles impregnated with polymers. Dispersing the aerogel particles impregnated with polymers within the polymer form prior to adding molten metal allows the aerogel particles to be fully dispersed throughout the metal form.

13 Claims, 13 Drawing Sheets

(56) References Cited

U.S. PATENT DOCUMENTS

| | | |
|---|---|---|
| 9,136,536 B2 | 9/2015 | Grigorian et al. |
| 9,260,581 B2 | 2/2016 | Leventis et al. |
| 9,276,190 B2 | 3/2016 | Pen |
| 9,381,471 B2 | 7/2016 | Pénicaud |
| 9,449,723 B2 | 9/2016 | Park et al. |
| 9,522,358 B2 | 12/2016 | Zhang et al. |
| 9,593,225 B2 | 3/2017 | Leventis et al. |
| 2004/0077738 A1* | 4/2004 | Field .................. E04F 13/00 521/50 |
| 2008/0287561 A1 | 11/2008 | Menashi et al. |
| 2008/0311398 A1 | 12/2008 | Bauer et al. |
| 2009/0226700 A1* | 9/2009 | Ratke ................... C22C 1/1036 428/316.6 |
| 2011/0250428 A1 | 10/2011 | Leventis et al. |
| 2011/0311802 A1* | 12/2011 | Cho .................... B01J 13/0091 428/316.6 |
| 2012/0134909 A1 | 5/2012 | Leventis et al. |
| 2012/0175012 A1 | 7/2012 | Goodwin et al. |
| 2013/0022769 A1 | 1/2013 | Sabri et al. |
| 2014/0128488 A1 | 5/2014 | Lotti et al. |
| 2014/0350134 A1 | 11/2014 | Rodman et al. |
| 2015/0141533 A1 | 5/2015 | Joshi et al. |
| 2016/0280877 A1 | 9/2016 | Kim et al. |
| 2017/0050990 A1 | 2/2017 | Leventis et al. |
| 2017/0096548 A1 | 4/2017 | Kim et al. |

FOREIGN PATENT DOCUMENTS

| | | |
|---|---|---|
| EP | 0254778 A1 | 2/1988 |
| EP | 1306148 B1 | 9/2006 |
| EP | 1952908 B1 | 1/2013 |
| WO | 2015065557 A1 | 5/2015 |
| WO | 2016127084 A1 | 8/2016 |
| WO | 2016161123 A1 | 10/2016 |
| WO | 2017087511 A1 | 5/2017 |

OTHER PUBLICATIONS

Rosa, "Synthesis of Amine-Modified Aerogel Sorbents and Metal-Organic Framework-5 (MOF-5) Membranes for Carbon Dioxide Separation," Arizona State University, 2010, pp. 1-85.

* cited by examiner

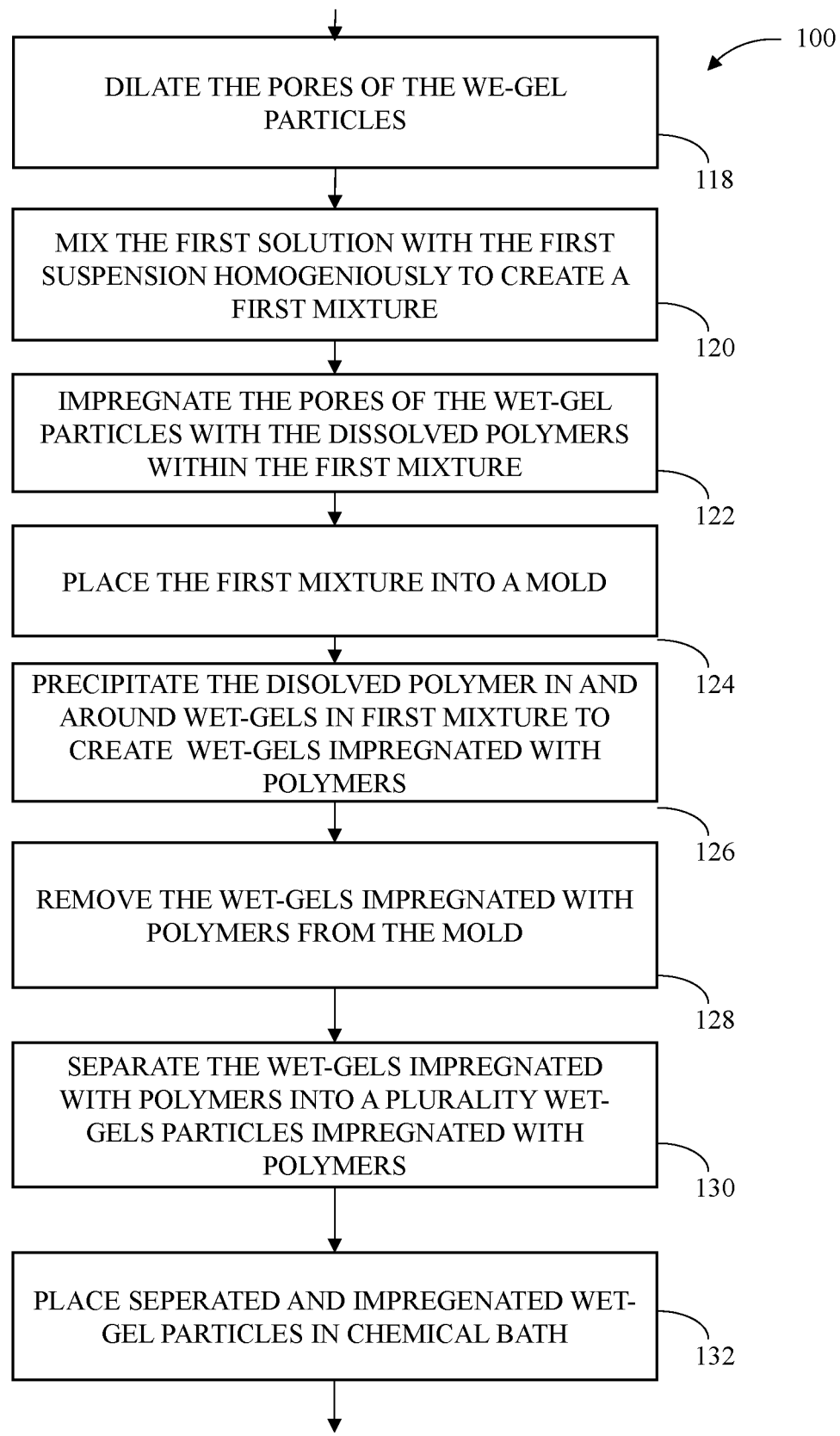
FIG. 1b     CONTINUED IN FIG. 1c

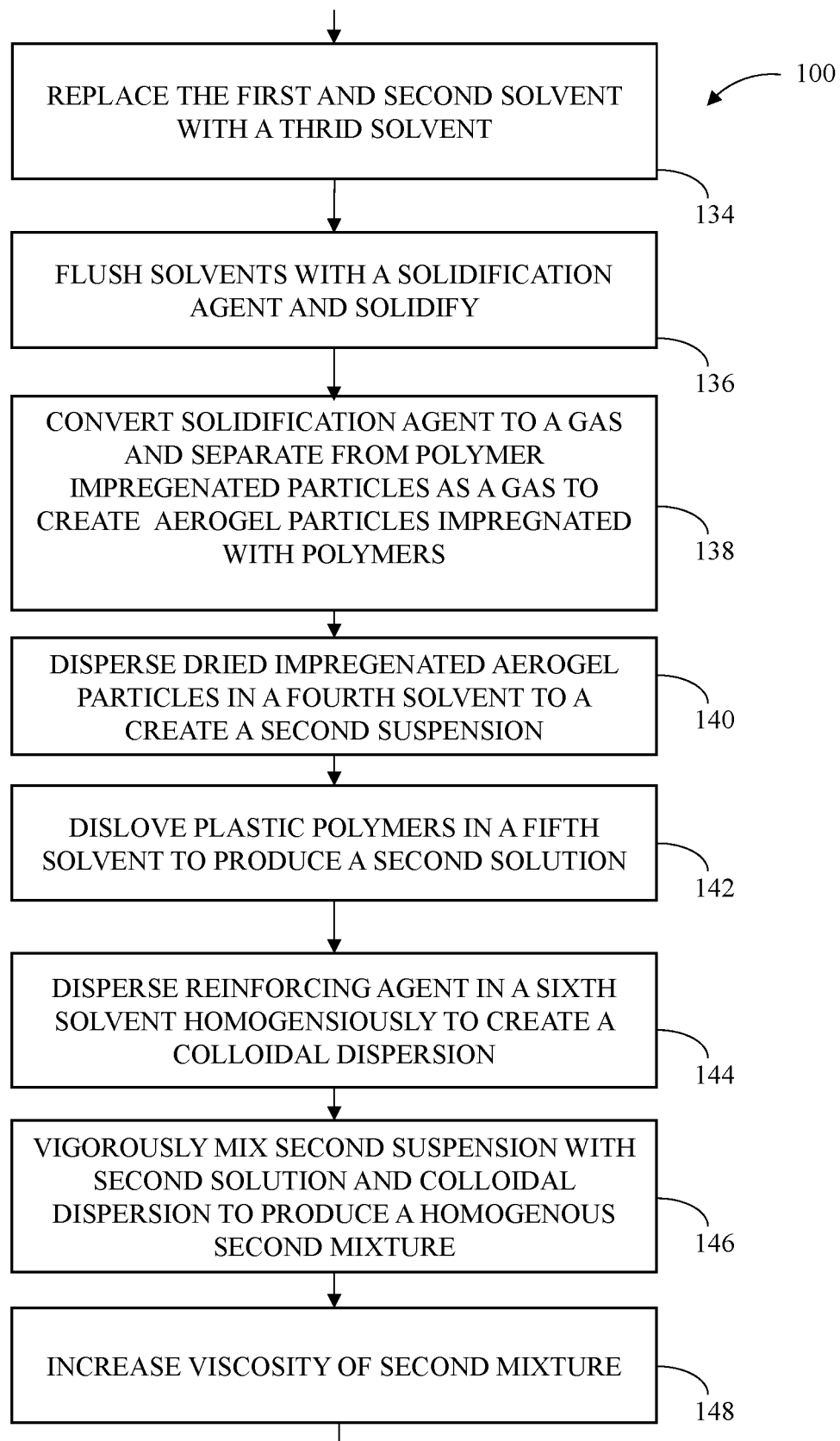
FIG. 1c  CONTINUED IN FIG. 1d

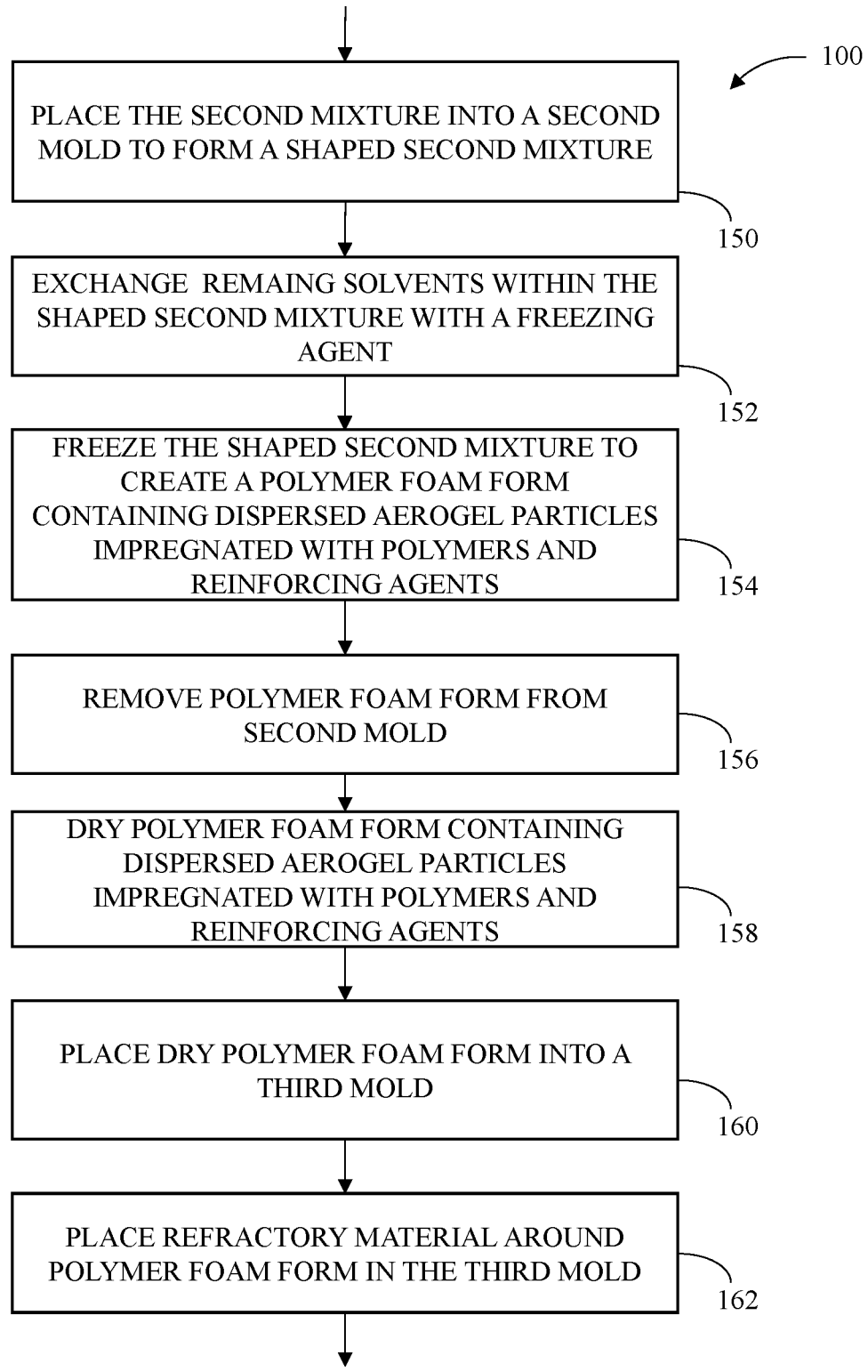
FIG. 1d  CONTINUED IN FIG. 1e

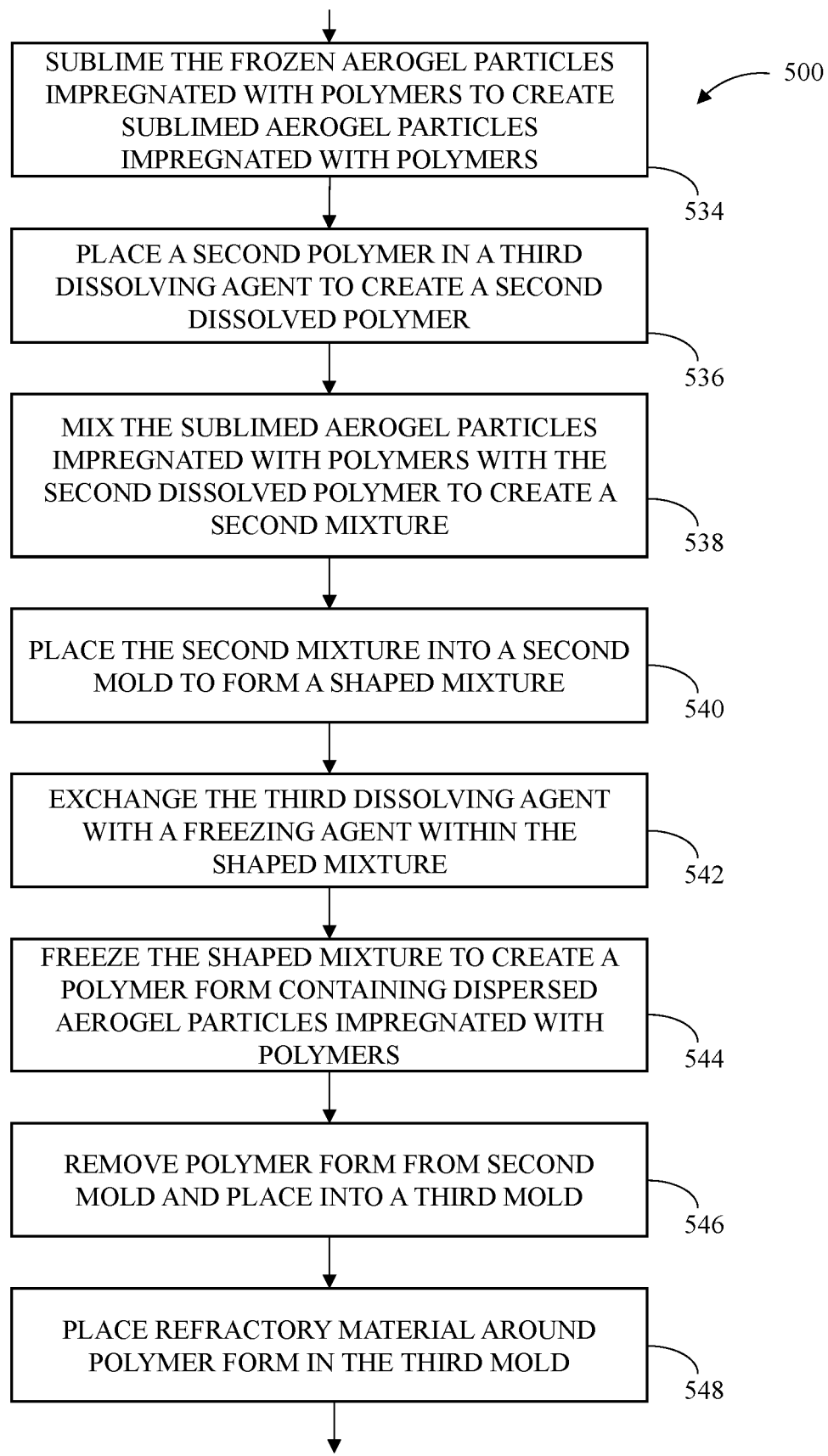
FIG. 5c  CONTINUED IN FIG. 5d

METHOD OF PRODUCING A METAL FORM CONTAINING DISPERSED AEROGEL PARTICLES IMPREGNATED WITH POLYMERS

CROSS-REFERENCE TO RELATED APPLICATIONS

This application is a continuation in part of International Application No. PCT/US 2016/059611, filed Oct. 29, 2016, International Application No. PCT/US 17/30216, filed on Apr. 28, 2017, and U.S. application Ser. No. 15/956,252, filed on Apr. 18, 2018, which claim the benefit of U.S. Provisional Application No. 62/248,162, filed on Oct. 29, 2015, and U.S. Provisional Application No. 62/248,194, filed on Oct. 29, 2015. The entire disclosures of each of the above applications are incorporated herein by reference.

BACKGROUND OF THE INVENTION

1. Field of the Invention

A method of producing a metal form containing dispersed aerogel particles impregnated with polymers.

2. Description of the Prior Art

The 2008/0287561 ('561 publication) publication discloses an aerogel that is separated into multiple aerogel particles. The aerogel is coated with a coating substance in order to substantially prevent intrusion of a polymer, ceramic and/or glass matrix into the pores of the aerogel. The coated aerogel is then dispersed or otherwise introduced into the polymer, ceramic and/or glass matrix.

The 2009/0226700 ('700 publication) publication discloses a method of creating a metal aerogel. The method begins by placing aerogel particles into a mold. Molten metal is poured into the mold. The molten metal mixes with the aerogel particles creating a metal form with aerogel particles. The metal form is cooled in order to solidify the molten metal. The metal form containing aerogel particles is then removed from the mold.

SUMMARY OF THE INVENTION

The current method produces a metal form containing dispersed aerogel particles impregnated with polymers. Another aspect of the invention includes either creating a well dispersed metal aerogel composite and/or impregnating an aerogel with any number of polymers.

Advantages of the Invention

The current method allows for aerogel particles to be impregnated with polymers, allows for aerogel particles to be dispersed throughout a metal form, and allows for the production of a metal form containing dispersed aerogel particles impregnated with polymers by creating a plastic form containing dispersed aerogel particles, by pouring molten metal onto the plastic form, and then by replacing the plastic form with molten metal. Unlike the '561 publication, the current method allows for the impregnation of aerogel with polymers. Also, unlike the '700 publication, the current method allows for aerogel particles to be fully dispersed in desired locations within a metal form instead of being concentrated in one region. Further, unlike both applications, the current method produces a metal form containing dispersed aerogel particles impregnated with polymers.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1b is the continued flow chart from FIG. 1a showing the method of producing the metal form containing dispersed aerogel particles impregnated with polymers;

FIG. 1c is the continued flow chart from FIG. 1b showing the method of producing the metal form containing dispersed aerogel particles impregnated with polymers;

FIG. 1d is the continued flow chart from FIG. 1c showing the method of producing the metal form containing dispersed aerogel particles impregnated with polymers;

FIG. 5c is the continued flow chart from FIG. 5b showing another embodiment of the method of producing the metal form containing dispersed aerogel particles impregnated with polymers.

DESCRIPTION OF THE ENABLING EMBODIMENT

Figure 1A:
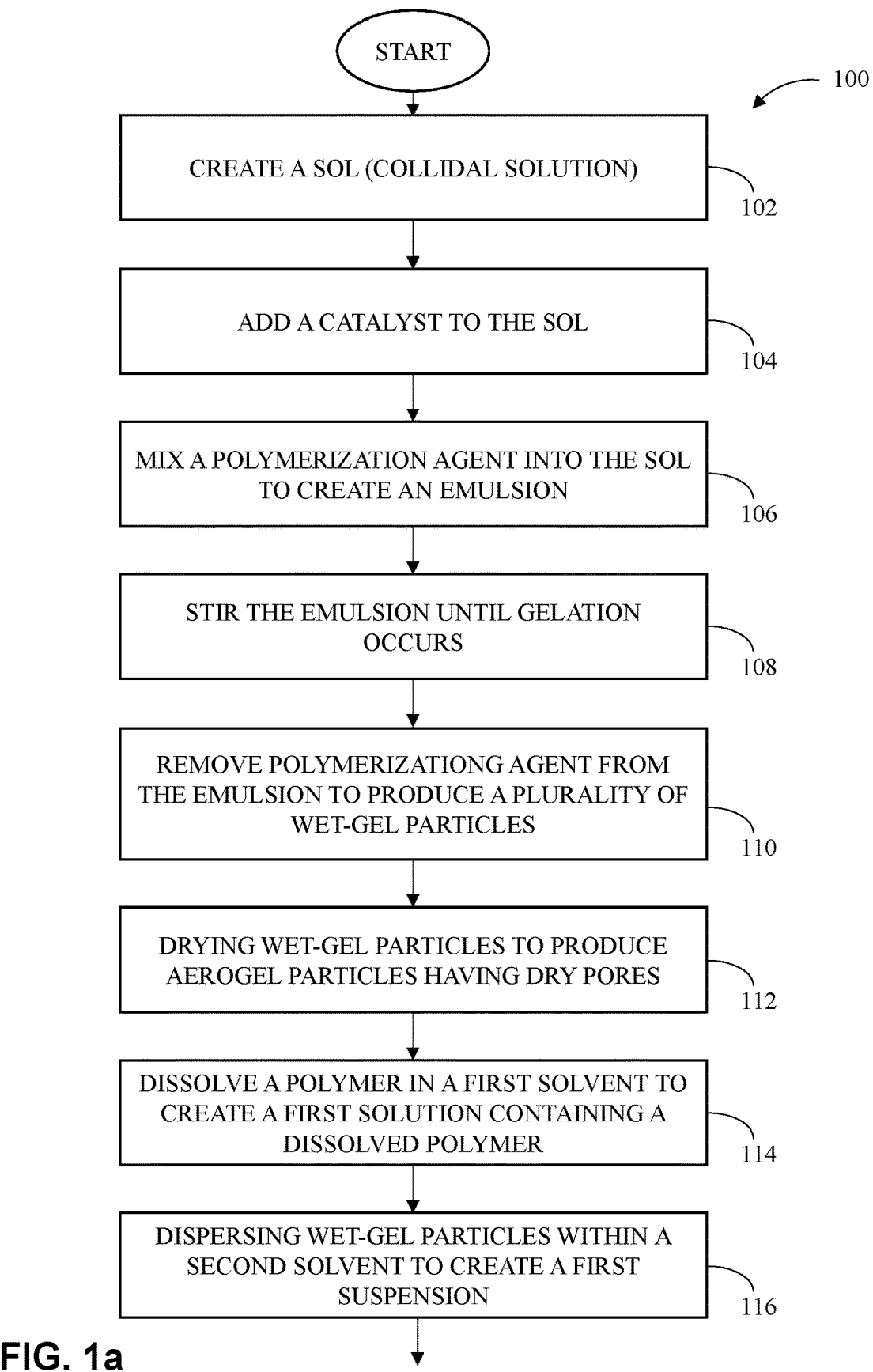
FIG. 1a is a flow chart showing a method of producing a metal form containing dispersed aerogel particles impregnated with polymers.
Figure 1E:
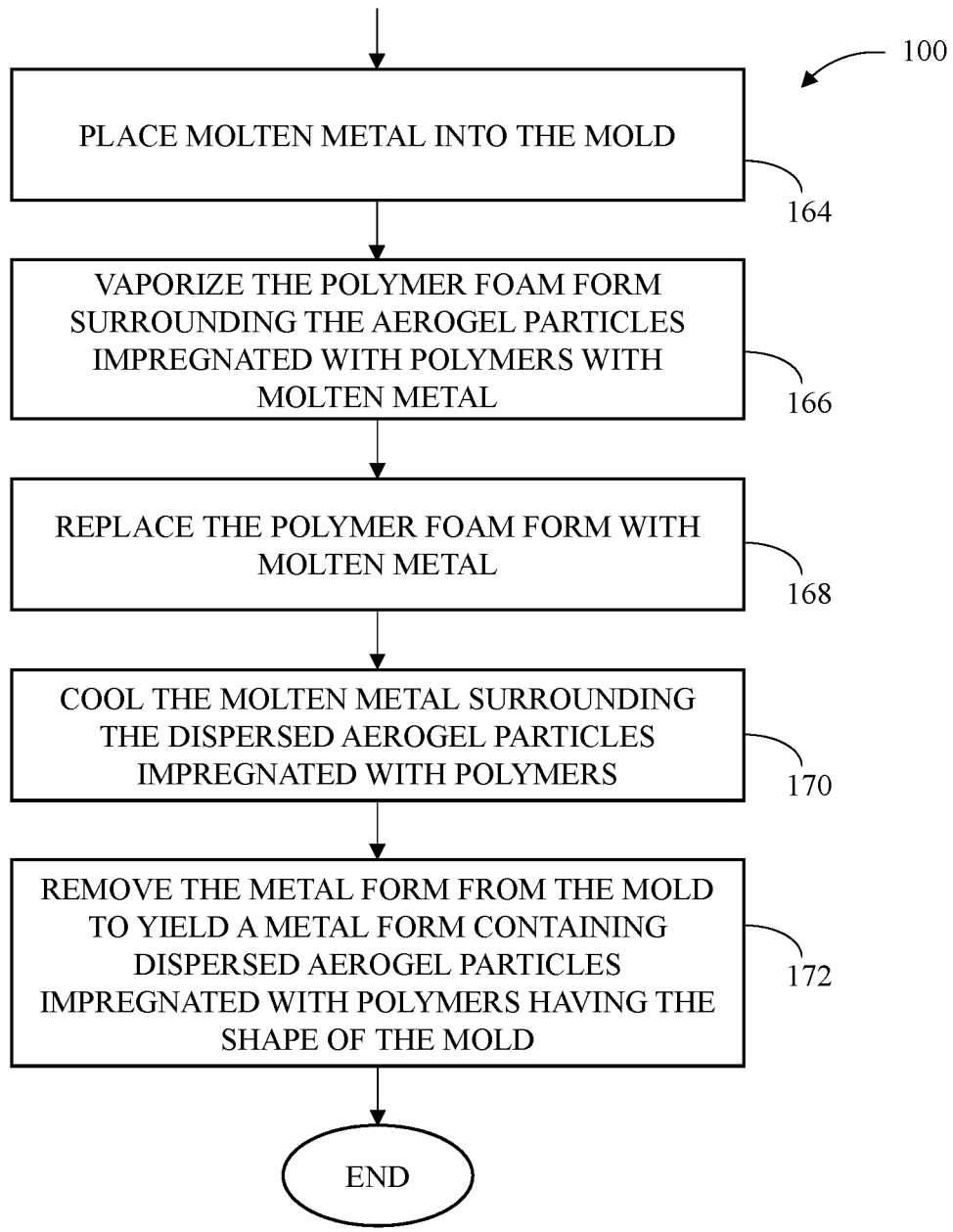
FIG. 1e is the continued flow chart from FIG. 1d showing the method of producing the metal form containing dispersed aerogel particles impregnated with polymers.

The following methods describe a method of producing a metal form containing dispersed aerogel particles, a method of producing an aerogel impregnated with polymers, and a method of producing a metal form containing dispersed aerogel particles. An aerogel is a synthetic material that is porous and lightweight. Aerogels are derived from a gel where the liquid component of the gel has been replaced with a gas. A variety of chemical compounds can be used to make aerogel by extracting the liquid component of the gel using supercritical drying, which allows the liquid to be slowly dried away without causing the solid matrix of the gel to collapse from capillary action. Gels of different compositions may be synthesized through a number of known methods, which may include a sol-gel process. The sol-gel process involves the production of sol, or colloidal suspension of very small solid particles in a continuous liquid medium, where nanostructures form the solid particles dispersed in the liquid medium. The sol-gel process also involves causing the nanostructures in the sol to interconnect to form a 3D network, forming a gel. As provided herein, a gel may be a wet solid-like material in which a solid network of interconnected nanostructures spans the volume of a liquid medium. The continuous phase is a solid network and the dispersed phase is a liquid. Generally speaking, the term wet-gel and sol-gel can refer to aerogel materials having pores that are substantially filled with liquid particles. As provided herein, aerogels can be dry, nanoporous, nanostructured materials containing both mesopores and micropores. As provided her in, aerogel particles may be considered matrices of dry materials comprising at least a 50% void space by volume in which the solid-phase component comprises a 3D nanostructured solid network. Thus aerogels do not have a designated material or chemical formula, but represent a group of materials with a certain geometric structure.

Method 100, shown in FIGS. 1a, 1b, 1c, 1d, and 1e, illustrates a method of producing a metal form containing dispersed aerogel particles impregnated with polymers which begins at step 102 with creating a colloidal solution herein referred to as a sol. The sol starts the process of creating sol-gel particles. The sol is comprised of a plurality of sol-gel precursors and at least one solvent. The sol-gel precursors may be any organic or inorganic material known in the art, such as, silica, metal and metalloid oxides, metal chalcogenides, metals, metalloids, amorphous carbon, graphitic carbon, diamond, discrete nanoscale objects, organic polymers, biopolymers, polyurea, a polyurethane, a polyisocyanate, a polyisocyanurate, a polyimide, a polyamide, a polybenzoxazine, a polyacrylonitrile, a polyetheretherketone, a polyetherketoneketone, a polybenzoxazole, a phenolic polymer, a resorcinol-formaldehyde polymer, a melamine-formaldehyde polymer, a resorcinol-melamine-formaldehyde polymer, a furfural-formaldehyde polymer, an acetic-acid-based polymer, a polymer-crosslinked oxide, a silica-polysaccharide polymer, a silica-pectin polymer, a polysaccharide, amorphous carbon, graphitic carbon, graphene, diamond, boron nitride, an alginate, a chitin, a chitosan, a pectin, a gelatin, a gelan, a gum, a cellulose, a virus, a biopolymer, an ormosil, an organic-inorganic hybrid material, a rubber, a polybutadiene, a poly(methyl pentene), a polypentene, a polybutene, a polyethylene, a polypropylene, a carbon nanotube, a boron nitride nanotube, graphene, two-dimensional boron nitride, and combinations thereof as non-limiting examples. In some embodiments, suitable matrix materials may be reinforced with a fiber, a fibrous batting, aligned fibers, chopped fibers, or another suitable material. In some of these embodiments, the fiber comprises silica, glass, carbon, a polymer, poly(acrylonitrile), oxidized poly(acrylonitrile), poly(p-phenylene-2,6-benzobisoxazole) (e.g., ZYLON® polyoxazole manufactured by Toyobo Corp. (Japan)), poly(paraphenylene terephthalamide) (e.g., KEVLAR® para-aramid manufactured by DuPont (Wilmington, Del.)), ultrahigh molecular weight polyethylene (e.g., SPECTRA® ultrahigh molecular weight polyethylene manufactured by Honeywell (Morris Plains, N.J.) or DYNEEMA® ultrahigh molecular weight polyethylene manufactured by Royal DSM (Netherlands)), poly(hydroquinone diimidazopyridine) (e.g., M5), polyamide (e.g., NYLON®), natural cellulose, synthetic cellulose, silk, viscose (e.g., rayon), a biologically-derived fiber, a biologically-inspired fiber, a ceramic, alumina, silica, zirconia, yttria-stabilized zirconia, hafnia, boron, metal/metalloid carbide (e.g., silicon carbide), metal/metalloid nitride (e.g., boron nitride), nanotubes, carbon nanotubes, carbon nanofibers, boron nitride nanotubes, oxide nanotubes as non-limiting examples. Metalloids include boron, silicon, germanium, arsenic, antimony, tellurium, polonium and combinations thereof as non-limiting examples. Metals include lithium, sodium, potassium, rubidium, cesium, francium, beryllium, magnesium, calcium, strontium, barium, radium, aluminum, scandium, titanium, vanadium, chromium, manganese, iron, cobalt, nickel, copper, zinc, gallium, yttrium, zirconium, niobium, molybdenum, technetium, ruthenium, rhodium, palladium, silver, cadmium, indium, tin, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth, actinium, thorium, protactinium, uranium, neptunium, plutonium, americium, curium, berkelium, californium, einsteinium, fermium, mendelevium, nobelium, lawrencium, the transactinide metals and combinations thereof as non-limiting examples. Discrete nanoscale objects include carbon nanotubes, boron nitride nanotubes, viruses, semiconducting quantum dots, graphene, and combinations thereof as non-limiting examples.

The solvent may be selected from the following: 2-methoxyethanol, 2,6,10,14-tetramethyl pentadecane acetic acid, acetone, acetonitrile, acrolein, alcohols, acetic acid, amyl alcohol, amyl acetate, aniline, aliphatic halogenated hydrocarbons, benzene, 1-butanol, 2-butanol, 2-butanone, t-butyl alcohol, N-butyraldehyde, N-butanol, N-butanol, sec-butanol, ie/t-butanol, carbon tetrachloride, chlorobenzene, chloroform, chlorex, cresylic acid, cyclohexanol, C1-C6 alcohols, cyclohexanone, cyclo-cresylic acid, cycloaliphatic halogenated hydrocarbons, decane, decanes, dimethylsulfoxide, Dimethylacetamide, dimethylformamide, N,N'-dimethylformamide, 1,4-dioxane, epoxides, ethanol, ethyl acetate, ethylene glycol, fluorinated ethers, furfural, furfural alcohol, glycerin, glycols, heptane, Hexamethylphosphoramide, Hexamethylphosphorous triamide, hexane, hexanes, N-hexane, hydrocarbons, isopropanol, isopropanol, liquid hydrocarbons, liquid SO2, methanol, methoxy ethanol, methylene chloride, Methyl-ethyl Ketone, methyl t-butyl ether N-methyl-2-pyrrolidinone, nitromethane, nitrobenzene, pentane, pentanol, petroleum ether, 1-propanol, 2-propanol, ft-propanol, polyols, pyridine, quinolone, tert-butyl alcohol, tetrahydrofuran, toluene, triethyl amine water, o-xylene, m-xylene, p-xylene. Upon the addition of sol-gel precursors to at least one of the aforementioned solvents together, the combination is vigorously agitated until the a homogenous sol is created. Once the sol is created, the process moves to Step 104.

Step 104 consists of stirring a catalyst into the sol in order to accelerate the formation of solid nanoparticle networks containing a liquid. The catalyst activates one or more of the solvents within the sol to create solid cohesive network of nanoparticles suspended in the sol. The catalyst may be selected from a group comprising of primary amines, secondary amines, tertiary amines, triazine derivatives, organometallic compounds, metal chelates, quaternary ammonium salts, ammonium hydroxides, alkali metals, alkaline earth metal hydroxides, alkoxides, and carboxylates. Once the catalyst is added and stirred into the sol then method 100 moves to step 106.

During step 106, a polymerization agent is added to the sol in order to create an emulsion. An emulsion, as used herein, is defined as a mixture contained more than one liquid. The polymerization agent may be any one of the aforementioned solvents used in step 102, as well as other compounds such as liquid monomers or polymers with moieties having functional groups comprised of the following: Alkyl, Alkenyl, Alkyynyl, Phenyl, Halo. Fluro, Chloro, Bromo, Iodo, Hydroxyl, carbonyl, Aldehyde, Haloformyl, Carbonate ester, Carboxylate, Carboxyl, Ester, Methoxy, Hydroperoxy, Peroxy, Ether, Hemiacetal, Hemiketal, Acetal, Ketal, Orthoester, Methylenedioxy, Orthocarbonate ester, Carboxamide, Amines, Imines, Imide Azide, Azo, Cyanate, Isocyanate, Nitrate, Isonitrile, Nitrosooxy, Nitro, Nitrose, Oxime, Pyridyl, Sulfhydryl, Sulfide, Disulfide, Sulfinyl, Sulfonyl, Sulfino, Sulfo, Thiocyanate, Isothiocyanate, Carbonothioyl, Carbonothioyl, Phosphino, Phosphono, Phosphate, Borono, Boronate, Borino, Borinate or radical moieties containing single, double, triple bonds or carboxylic acyl radical. The polymerization agent may act as a means of crosslinking the sol's networks. The polymerization agent can also be and additional catalysts from steps 106. The polymerization agent may be a co-solvent that adjusts the ph of the sol's colloidal solution. The polymerization agent may also serve as a means for aggregation of particles having an affinity for polar or nonpolar solvents. The polymerization agent can act to influence the nature of the sol's nanoparticle network formation at liquid-liquid or liquid-air interfaces, such as orienting the formation of the solid network through the formation of micelles. Once the emulsion is created, the method 100 continues to step 108.

During step 108, the emulsion is stirred until gelation occurs. Gelation, as used herein, is defined as the formation of macroscopic gel networks. The emulsion may be subjected to low temperatures to promote gelation or gelation may occur through chemical reactions taking place within the sol. Once gelation occurs, wet-gel particles are said to be formed and the method 100 continues to step 110.

During step 110, a the polymerization agent can be removed from the wet-gel particles by means such as blotting, centrifuging, crosslinking, decanting, draining, evaporating, filtering, polymerizing, scraping, rinsing, rubbing or washing. Removing the polymerization agent creates wet-gel particles which contain nanopores. Once the polymerization agent is removed, the method 100 continues to step 112.

During step 112, the wet-gel particles are dried through ambient pressure drying, evaporation, lyophilization and or supercritical drying. Once drying is finished, the remaining particles will be dried aerogel particles and the method 100 can continue to step 114.

During step 114, a polymer is placed within a first solvent that can dissolve a preponderance the polymer creating a first solution. The polymer can be a natural polymer or synthetic polymer comprised of a plurality of molecular units. Some preferred polymers may be one of cellulose, branched, unbranched, crystalline, semicrystaline, amorphous, polyester, polyethylene, terephthalate, polyolefin, polyacrylic acid, polymethylacrylate, expoxy, polymethyl methacrylate, acrylonitrile butadiene styrene, polyimides, polyamides, polycaprolactam, polylactic acid, polybenzimidazole, polycarbonate, polyether sulfone, polyetherether ketone, polyetherimide, polyethylene, medium-density polyethylene, low-density polyethylene, polyphenylene oxide, polyphenylene sulfide, polypropylene, polystyrene, polyvinyl chloride, and polytetrafluoroethylene, or others not listed here. The first dissolving agent may be any of the solvents list as suitable for step 102. Once the first solution is created, the method 100 moves to step 116.

During step 116, wet-gel particles from step 110 or dried aerogel particles from step 112 are dispersed in a second solvent to form a uniform dispersion of wet-gel particles in a second solvent herein referred to as the first suspension. After the first suspension is formed the method 100 proceeds to step 118.

During step 118, the pores of the wet-gel particles are dilated within the first suspension, within the first mixture. The process of dilating the pores of the aerogel particles may be completed in a number of ways such as solvent induced swelling or by increasing the temperature or the pressure of the wet-gel particles. In this method, the wet-gel particles may be placed within a pressure chamber so that the aerogel particles are subjected to high temperature and increased pressure in order to dilate the pores of the aerogel particles. Once the pores of the aerogel particles are dilated, the method 100 moves to step 120.

During step 120, the wet-gel particles having dilated pores in the first suspension are mixed vigorously with the dissolved polymers in the first solution and agitated until a homogenous mixture forms herein referred to as the first mixture. One the first mixture is formed the method 100 can proceed to step 122.

During step 122, the wet-gel particles in the first mixture are infiltrated with the dissolved polymers within the first mixture, thus creating wet-gel particles infiltrated with polymers. This step may take place within a pressure vessel where the temperature and pressure within the vessel is increased in order to allow the polymers to enter the pores of the wet-gel particles, thereby infiltrating the wet-gel particles with polymers. Once the infiltration step is completed then the method 100 continues to step 124.

During step 124, the first mixture containing the wet-gel particles infiltrated with polymers is placed into a first mold. The mold may be of any shape or design suitable for the entire contents of the first mixture. The method 100 continues to step 126.

During step 126, the dissolved polymer in and around the pores of the wet-gel particles is precipitated to form wet-gel particles impregnated with polymers. Precipitation may be induced through evaporation, sedimentation, depressurization, concentration, filtering, distillation or by first mixture is subjected to low temperatures to induce freezing. The temperature may be variable depending on the solvents and polymers used within the first mixture. Freezing the first mixture creates a solid form comprising wet-gel impregnated with polymers. This step may be completed within a pressure chamber by lowering the temperature within the pressure chamber in order to freeze the first mixture. Once the aerogel impregnated with polymers is frozen solid then the method 100 continues to step 128.

During step 128, the wet-gels impregnated with polymers is removed from the first mold. The wet-gel particles impregnated with polymers may optionally be mixed with filler material. The filler material may comprise graphene, graphene oxide, carbon nanotubes, cellulose nanocrystals as well as other two and three dimensional materials. Once removed from the mold, the method 100 may proceed to step 130.

In step 130, the wet-gels removed from the mold in steps 128 can be separated into many wet-gel particles impregnated with polymers. Once separated, the method 100 may proceed to step 132.

In step 132, the wet-gel particles impregnated with polymers are placed into a chemical bath. The chemical bath works as a cleaning agent and the chemicals used may be selected from one or more the aforementioned solvents listed as being suitable for steps 102. Once the wet-gel particles impregnated with polymers are placed in the chemical bath, the method 100 continues to step 134.

During step 134, the first and second solvent dispersed throughout the wet-gel particles impregnated with polymers are replaced with a third solvent. The process of replacing may be completed through solvent exchange which allows the third solvent to replace a different solvent. The step of replacing the first and second solvents with a third solvent may be completed within a pressure chamber. This may be conducted by flushing the pressure chamber, while the wet-gel particles impregnated with polymers are within the pressure chamber, with the third solvent in order to remove a preponderance of the first and second solvents and leave a preponderance of the third solvent within the wet-gel particles, thereby exchanging the first and second solvents with the third solvent. The third solvent may be selected from one or more the aforementioned solvents listed as being suitable for steps 102. Once solvent exchanged is complete, the method 100 continues to step 136.

Then during step 136, the third solvent is replaced with a solidification agent through another solvent exchange process because the freezing agent and third solvent are partially miscible with one another. By replacing the third solvent with a solidification agent, the wet-gel particles impregnated with polymers in the solidification agent are solidified, creating a solid sol-gel particle network impregnated with polymers. The freezing agent may be selected from liquid carbon dioxide, supercritical carbon dioxide, nitrous oxide, and supercritical dihydrogen monoxide. The solidification agent might also allow for the surface tension of any remaining first, second, or third solvent to be reduced; thus, allowing for solid aerogel particles to be produced through ambient pressure drying. In these instances, the solidification agent is said to have a polar or nonpolar charge similar to the surface of the wet-gel particle network, thus making the wet-gel particle more rigid or solid through mutual repulsive forces. Once the wet-gel particles impregnated with polymers in the solidification agent are solidified, the method 100 continues to step 138.

During step 138, the solidified agent is separated from the wet-gel particles by converting the solidification agent to a gas and separating the gas from the wet-gel particles impregnated with polymers. This creates dried aerogel particles impregnated with polymers and ends step 138, thus moving method 100 to step 140.

During step 140, the dried aerogel particles impregnated with polymers are dispersed with a fourth solvent to generate a second suspension. The fourth solvent may be selected from one or more the aforementioned solvents listed as being suitable for steps 102. After the second suspension is formed the method 100 continues to step 142.

During step 142 a second polymer is placed in a fifth solvent in order to create a second solution. The second polymer may be selected from one of described herein, the polymer can be a natural polymer or synthetic polymer comprised of a plurality of molecular units. Some preferred polymers may be one of cellulose, branched, unbranched, crystalline, semicrystaline, amorphous, polyester, polyethylene, terephthalate, polyolefin, polyacrylic acid, polymethylacrylate, expoxy, polymethyl methacrylate, acrylonitrile butadiene styrene, polyimides, polyamides, polycaprolactam, polylactic acid, polybenzimidazole, polycarbonate, polyether sulfone, polyetherether ketone, polyetherimide, polyethylene, medium-density polyethylene, low-density polyethylene, polyphenylene oxide, polyphenylene sulfide, polypropylene, polystyrene, polyvinyl chloride, and polytetrafluoroethylene, or others not listed here, co-polymers thereof, and combinations therefore of. The fifth solvent may be selected from one or more the aforementioned solvents listed as being suitable for steps 102. After the second solution is formed, step 142 ends and the method 100 continues to step 144.

During step 144, a sixth solvent may be selected from one or more the aforementioned solvents listed as being suitable for steps 102 and mixed with at least one reinforcing agent to form a uniform first colloidal dispersion of reinforcing agent within the sixth solvent. The reinforcing agent in the colloidal dispersion may include: fibers, particles, matrices, foam, mesh crosslinking polymers, two-dimensional materials, few-layer materials often called two-dimensional materials, or nanotubes and can be composed of an aerogel, a zeolite, carbon, a polymer, a glass, crystals, bimetallic glasses, a metal, inorganic elements, functional moieties, or a combination thereof. After the first colloidal dispersion is formed, the method 100 can proceed to step 146.

In step 146, the second solution is added to the second suspension and first colloidal dispersion, and vigorously agitated to form a second mixture. After the formation of the second mixture, the method 100 can proceed to step 148.

In step 148, the viscosity of the second mixture is increased. The viscosity may be increased as a result of at least a portion the fourth, fifth, and or sixth solvent being removed. The viscosity of the second mixture may further increase as a result of change in temperature or pressure of the second mixture; or through crosslinking and or polymerization. The viscosity of the second mixture may also increase due to the solidification of the dissolved polymer in the second mixture. After the viscosity of the second mixture is increased, the method 100 can proceed to step 150.

In step 150, the second mixture is placed into a second mold in order to form a shaped mixture. After step 150 is complete, the method 100 can proceed to step 152.

In step 152, the fourth, fifth, and six solvents in the second mixture are exchanged with a freezing agent. The freezing agent may be selected from one of liquid carbon dioxide, supercritical carbon dioxide, nitrous oxide, and supercritical dihydrogen monoxide. The process of exchanging may take place within a pressure vessel. This may be completed by flushing the pressure vessel with a freezing agent, thereby replacing a preponderance of the solvents in the second mixture with the freezing agent. Once step 152 is complete, the method 100 continues to step 154.

During step 154, the shaped second mixture is frozen creating a polymer foam form containing dispersed aerogel particles impregnated with polymers and a reinforcing agent. The aerogel particles impregnated with polymers were dispersed throughout the shaped mixture and surrounded the second dissolved polymer. When then shaped mixture is frozen the second dissolved polymer freezes and surrounds the dispersed aerogel particles impregnated with polymers and dispersed reinforcing agents, creating a polymer foam form containing dispersed aerogel particles impregnated with polymers and dispersed reinforcing agents. Freezing the dissolved polymer of step 152 can also generate nano-porous structure in the now solid polymer from the second solution. The nanoporous polymer creates a polymer foam form. Once the polymer foam form containing dispersed aerogel particles impregnated with polymers and dispersed reinforcing agents is frozen the method 100 continues to step 156.

During step 156, the polymer foam form containing dispersed aerogel particles impregnated with polymers and dispersed reinforcing agents is removed from the second mold. After step 156 is finished, the method 100 can proceed to step 158.

In step 158, polymer foam form from step 156 can be dried. Drying of frozen polymer foam form containing dispersed aerogel particles impregnated with polymers and dispersed reinforcing agents can be accomplished by converting and remaining solid solvents and or freezing agents, which would otherwise be liquid at about room temperature; to a gas whereby the gas or gaseous mixtures can be separated from the polymer foam form. Thus, result of completing step 158 is a dried polymer foam form containing dispersed aerogel particles impregnated with polymers and dispersed reinforcing agents; which when achieved allows for the method of 100 to proceed to step 160.

In step 160, the dried polymer foam form containing dispersed aerogel particles impregnated with polymers and dispersed reinforcing agents is placed into a third mold with the desired shape of the final product. The third mold may be the same shape as the second mold or the third mold may be larger than the second mold. After placing dried polymer foam form containing dispersed aerogel particles impregnated with polymers and dispersed reinforcing agents into the third mold, the method of 100 can proceed to step 162.

During step 162, a refractory material is placed around the dried polymer foam form containing dispersed aerogel particles impregnated with polymers and dispersed reinforcing agents. After the refractory material is placed around the polymer foam form, the method 100 continues to step 164.

During step 164, molten metal is placed into the third mold. The metal used may be a molten form of one or more of boron, silicon, germanium, arsenic, antimony, tellurium, polonium, lithium, sodium, potassium, rubidium, cesium, francium, beryllium, magnesium, calcium, strontium, barium, radium, aluminum, scandium, titanium, vanadium, chromium, manganese, iron, cobalt, nickel, copper, zinc, gallium, yttrium, zirconium, niobium, molybdenum, technetium, ruthenium, rhodium, palladium, silver, cadmium, indium, tin, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth, actinium, thorium, protactinium, uranium, neptunium, plutonium, americium, curium, berkelium, californium, einsteinium, fermium, mendelevium, nobelium, lawrencium, and transactinide metals. Once the molten metal is placed in the third mold, the method 100 continues to step 166.

During step 166, the molten metal begins to vaporize the polymer foam form without substantially damaging the aerogel particles impregnated with polymers. In some instances, the molten metal will not damage the reinforcing agents substantially; in other instances, the reinforcing agents can be vaporized along with the polymer foam. In other instances, the molten metal or chemical species resulting from the vaporized polymers, or a combination there for of may cause chemical reactions with at least a portion of the aerogel particles or the reinforcing agents or a combination therefore of. The aerogel particles dispersed throughout the polymer form remain in place while the molten metal vaporizes the polymer form. After the molten metal vaporizes the polymer foam form, the method 100 can proceed to step 168.

During step 168, the molten metal replaces the polymer form after the polymer form is vaporized. The molten metal takes the place of the polymer form and the dispersed aerogel particles continue to remain in the desired location. In some instances, the dispersed reinforcing agents also remain in their desired location. Once the polymer form is replaced with molten metal, a metal form containing dispersed aerogel particles impregnated with polymers is created and the method 100 can proceed to step 170.

The method 100 continues to step 170 where the metal form is cooled so that the metal may harden and form a solid metal form. After step 170 is complete the method 100 proceeds to step 172.

During step 172, the metal form is removed from the third mold which yields a metal form containing dispersed aerogel particles impregnated with polymers having the shape of the third mold. In some instances the resulting metal form can contain dispersed aerogel particles impregnated with polymers and dispersed reinforcing agents. The process of cooling the molten metal form may be completed within a pressure vessel by lowering the temperature within the pressure vessel. In other instances step 144 can be skipped and steps 146 can instead be performed by mixing only the second solution and the second suspension. In instances when step 144 is skipped and omitted from step 146, the resulting second mixture of step 146 will proceed through steps 148-172 creating the desired result of the metal form containing dispersed aerogel particles impregnated with polymers. This ends the method 100 by creating the desired result of the metal form containing dispersed aerogel particles impregnated with polymers.

Figure 2A:
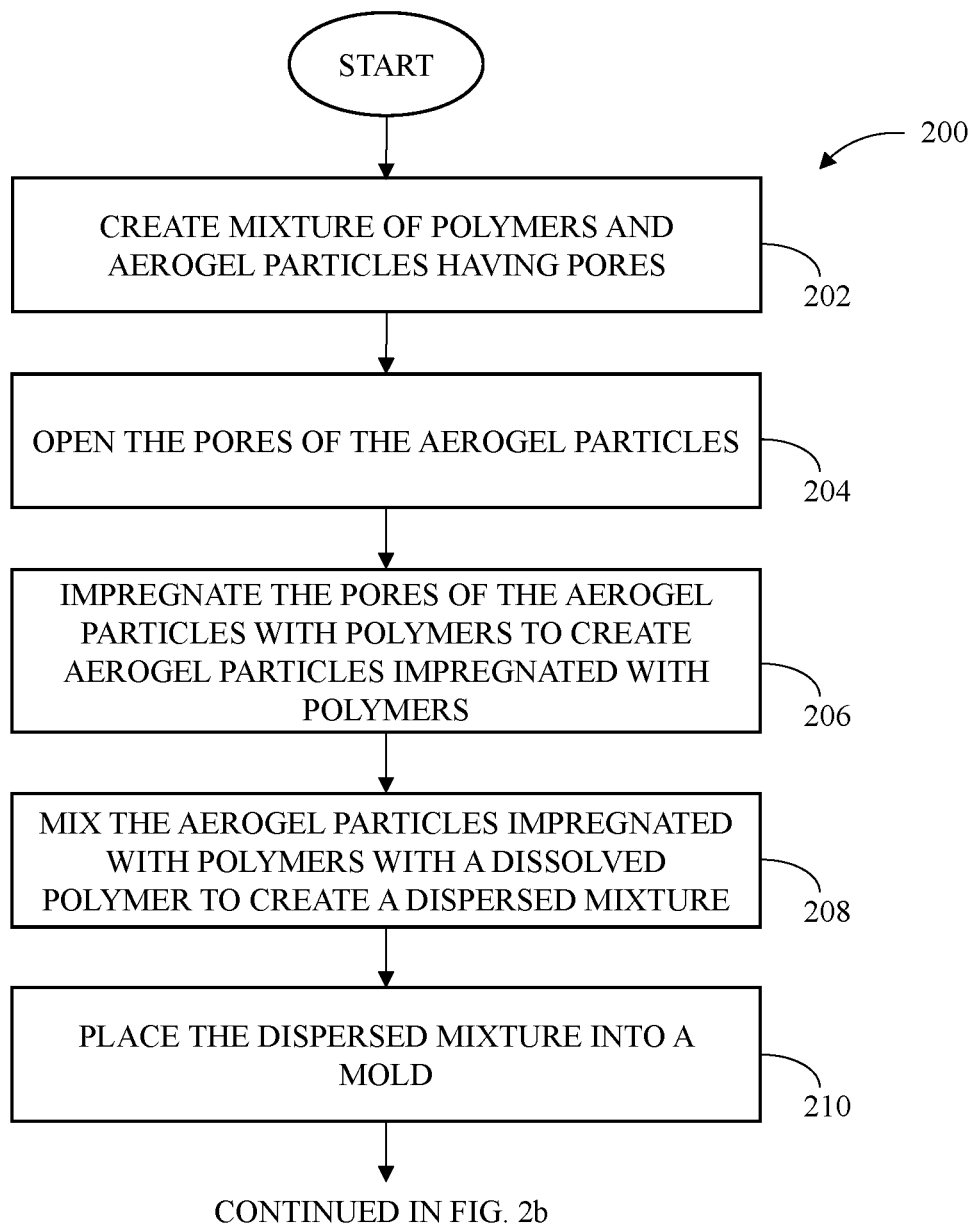
FIG. 2a is a second flow chart showing a method of producing a metal form containing dispersed aerogel particles impregnated with polymers.
Figure 2B:
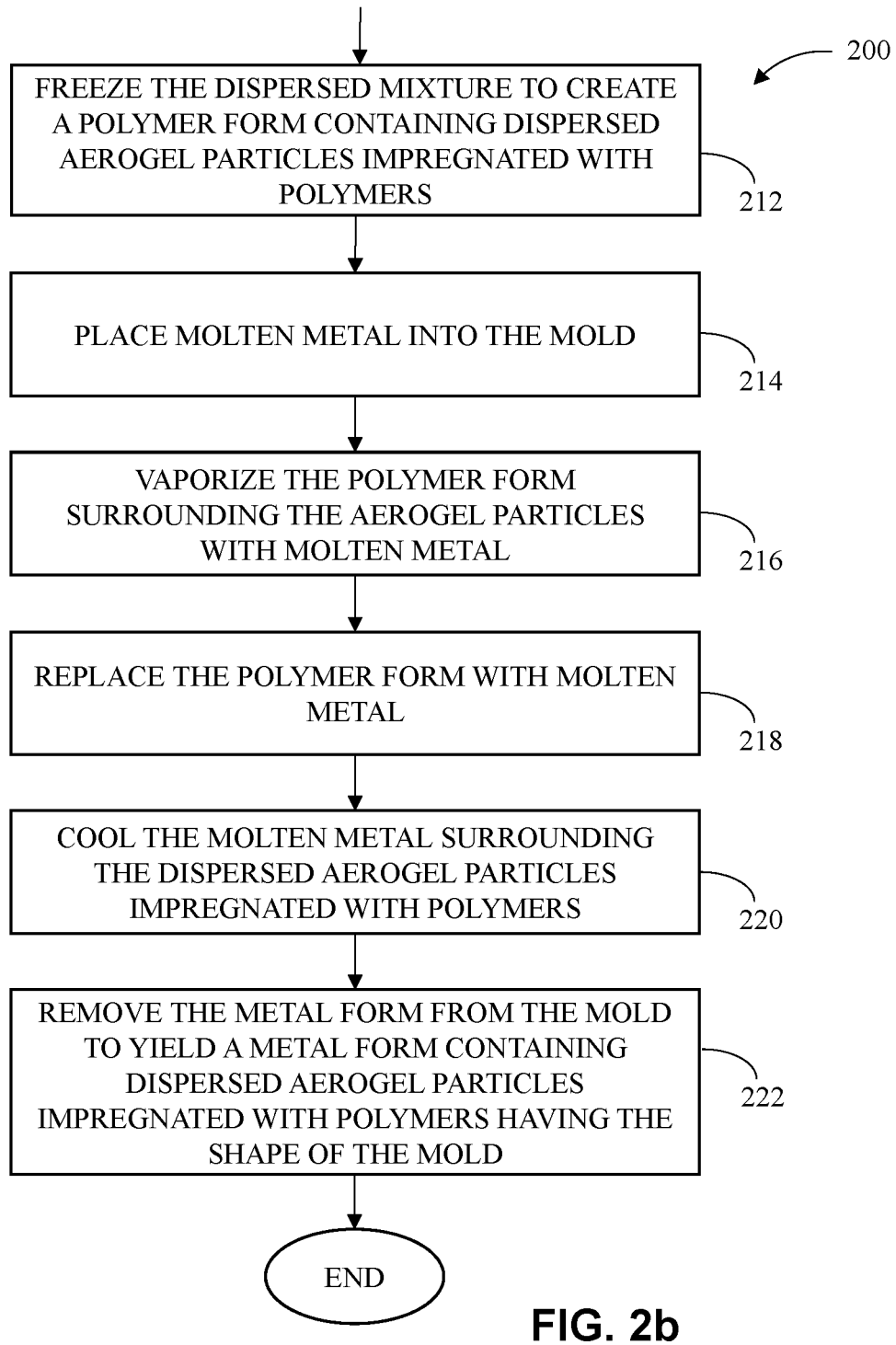
FIG. 2b is the continued flow chart from FIG. 2a showing the method of producing the metal form containing dispersed aerogel particles impregnated with polymers.

Method 200, which can be seen in FIGS. 2a and 2b, illustrates a second method of producing a metal form containing dispersed aerogel particles impregnated with polymers. Method 200 starts with step 202 by creating a mixture of polymers and aerogel particles. The aerogel particles have pores in order for them to later be impregnated with the polymers. Method 200 then continues to step 204.

During step 204, the pores of the aerogel particles are dilated in order to allow for impregnation. The process of dilating the pores may be done by increasing the temperature of the aerogel particles or by any other process that may enlarge the pores of the aerogel particles. During step 206, the pores of the aerogel particles are impregnated with polymers creating an aerogel impregnated with polymers. This may be completed by first placing the mixture of aerogel particles and polymers within a pressure chamber. By increasing the pressure and temperature within the pressure chamber, the pores of the aerogel particles are dilated and the polymers are allowed to impregnate the pores of the aerogel particles. Once step 206 is complete, the method 200 continues to step 208.

During step 208, the aerogel particles impregnated with polymers are placed into a mixture with a dissolved polymer creating a dispersed mixture. The dissolved polymer may consist of one or more of polyester, polyethylene, terephthalate, polyolefin, polyacrylic acid, polymethylacrylate, expoxy, polymethyl methacrylate, acrylonitrile butadiene styrene, polyimides, polyamides, polycaprolactam, polylactic acid, polybenzimidazole, polycarbonate, polyether sulfone, polyetherether ketone, polyetherimide, polyethylene, polyphenylene oxide, polyphenylene sulfide, polypropylene, polystyrene, polyvinyl chloride, and polytetrafluoroethylene. The aerogel particles impregnated with polymers may also be mixed with filler material. The filler material may comprise graphene, graphene oxide, carbon nanotubes, cellulose nanocrystals as well as other two and three dimensional materials. The method 200 then continues to step 210.

During step 210, the dispersed mixture is placed into a mold of a desired shape. The mold may be of any shape and size suitable to hold the dispersed mixture. The method 200 moves to step 212 where the dispersed mixture is frozen in order to solidify the dissolved polymers to create a polymer form containing dispersed aerogel particles impregnated with polymers. This step may be completed within a pressure chamber by decreasing the temperature within the pressure chamber in order to freeze the dispersed mixture. Next, the method 200 continues to step 214

During step 214, molten metal is placed into the mold. The metal used may be a molten form of one or more of boron, silicon, germanium, arsenic, antimony, tellurium, polonium, lithium, sodium, potassium, rubidium, cesium, francium, beryllium, magnesium, calcium, strontium, barium, radium, aluminum, scandium, titanium, vanadium, chromium, manganese, iron, cobalt, nickel, copper, zinc, gallium, yttrium, zirconium, niobium, molybdenum, technetium, ruthenium, rhodium, palladium, silver, cadmium, indium, tin, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth, actinium, thorium, protactinium, uranium, neptunium, plutonium, americium, curium, berkelium, californium, einsteinium, fermium, mendelevium, nobelium, lawrencium, and transactinide metals. Once the molten metal is placed in the mold the method 200 continues to step 216.

During step 216, the molten metal begins to vaporize the polymer form without damaging the aerogel particles impregnated with polymers. The aerogel particles dispersed throughout the polymer form remain in place while the molten metal vaporizes the polymer form. During step 218, the molten metal replaces the polymer form after being completely vaporized. The molten metal takes the place of the polymer form and the dispersed aerogel particles continue to remain in the desired location. Once the polymer form is replaced with molten metal, a metal form containing dispersed aerogel particles impregnated with polymers is created.

The method 200 continues to step 220 where the metal form is cooled so that the metal may harden and form a solid metal form. During step 222, the metal form is removed from the mold which yields a metal form containing dispersed aerogel particles impregnated with polymers having the shape of the mold. This ends the method 200 by creating the desired end result of the metal form containing dispersed aerogel particles impregnated with polymers.

Figure 3:
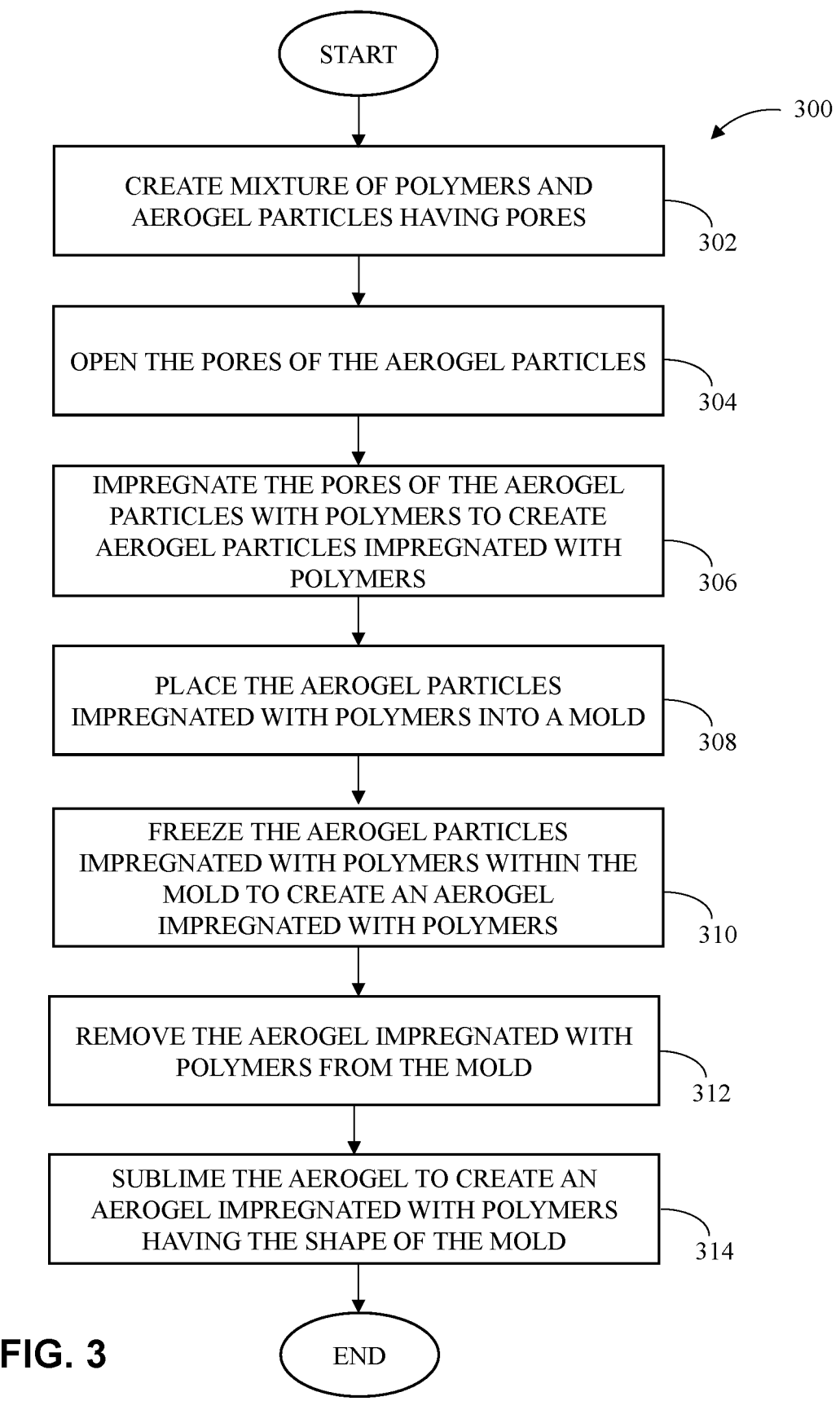
FIG. 3 is a flow chart showing a method of producing an aerogel impregnated with polymers.

Method 300, shown in FIG. 3, illustrates a method of producing an aerogel impregnated with polymers. Method 300 starts with step 302 beginning with creating a mixture of polymers and aerogel particles. The aerogel particles have pores in order for them to later be impregnated with the polymers. Method 300 then continues to step 304.

During step 304, the pores of the aerogel particles are dilated in order to allow for impregnation. The process of dilating the pores may be done by increasing the temperature of the aerogel particles or by any other process that may enlarge the pores of the aerogel particles. During step 306, the pores of the aerogel particles are impregnated with polymers creating an aerogel impregnated with polymers. This may be completed by first placing the mixture of aerogel particles and polymers within a pressure chamber. By increasing the pressure and temperature within the pressure chamber, the pores of the aerogel particles are dilated and the polymers are allowed to impregnate the pores of the aerogel particles. Once step 306 is complete, the method 300 continues to step 308.

During step 308, the aerogel particles impregnated with polymers are placed into a mold of a desired shape. The mold may be of any shape and size suitable to hold the aerogel particles impregnated with polymers. The method 300 moves to step 310 where the aerogel particles impregnated with polymers are frozen in order to create a single aerogel impregnated with polymers having a desired shape and size. This step may be completed within a pressure chamber by decreasing the temperature within the pressure chamber in order to freeze the aerogel particles impregnated with polymers. Next, the method 300 continues to step 312

During step 312, the aerogel impregnated with polymers is removed from the mold and then in step 314, the aerogel impregnated with polymers is sublimed in order to yield and aerogel impregnated with polymers having the shape of the mold. This ends the method 300.

Figure 4:
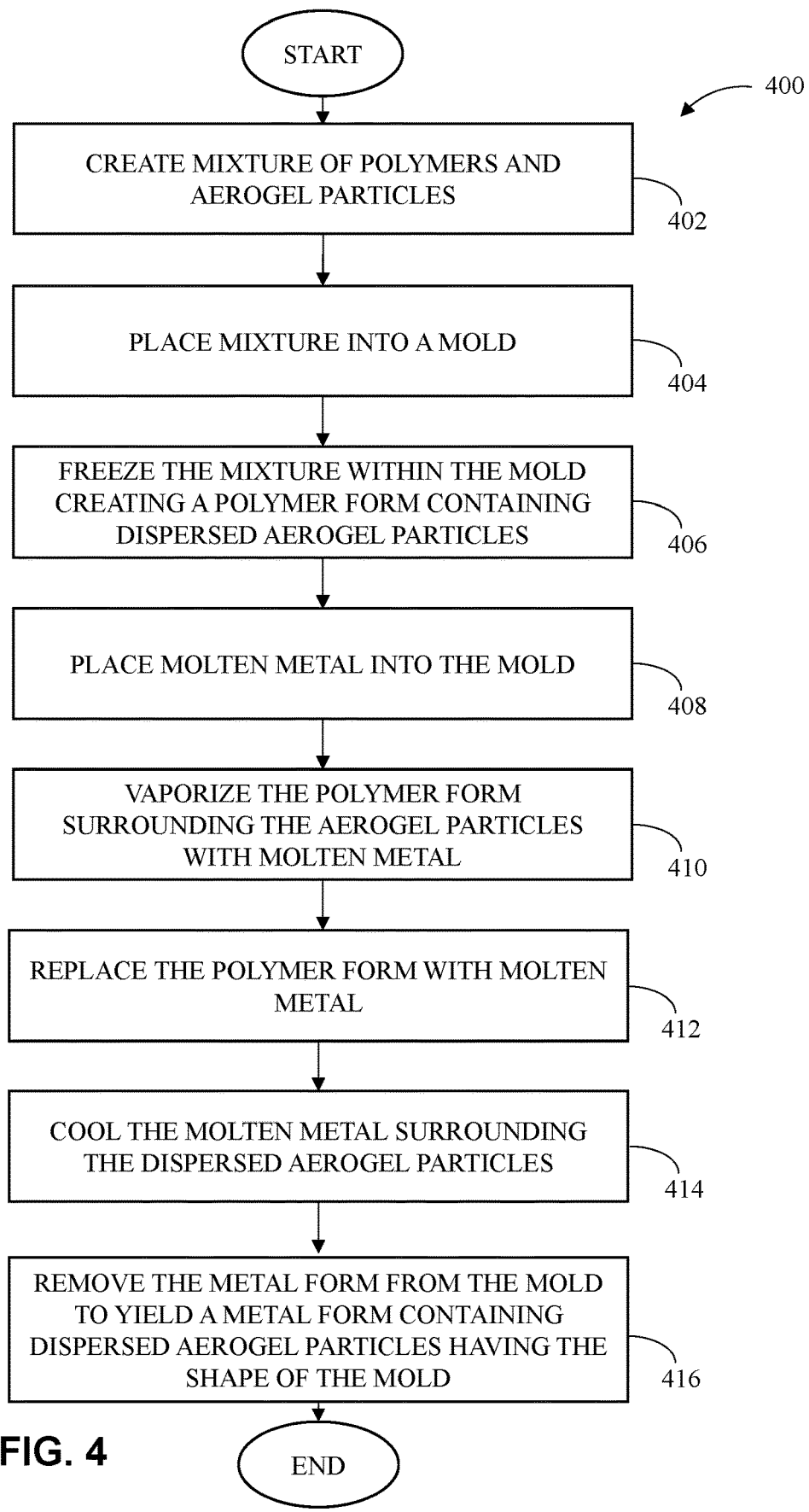
FIG. 4 is a flow chart showing a method of producing a metal form containing dispersed aerogel particles.
Figure 5A:
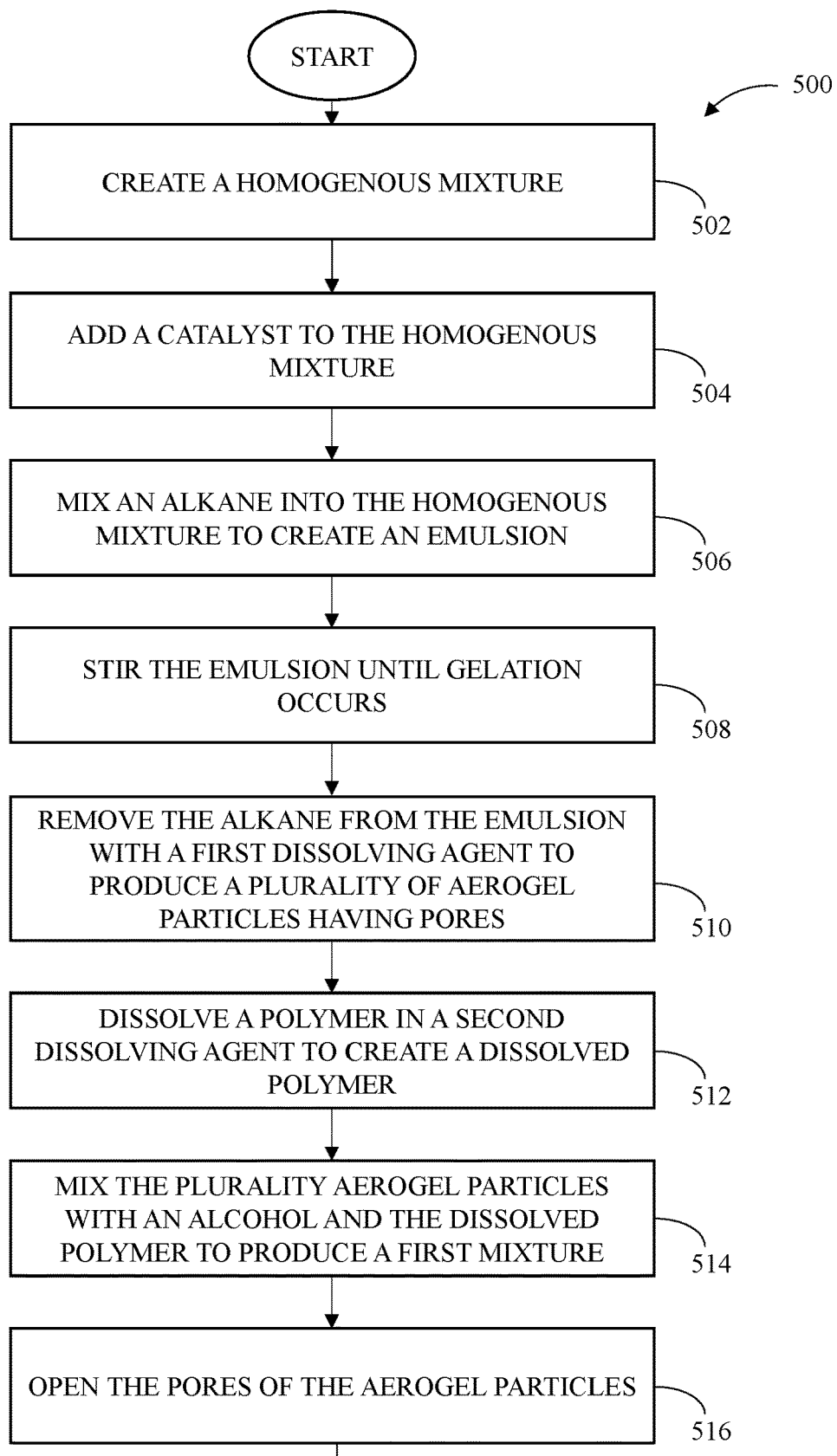
FIG. 5a is a flow chart showing another embodiment of a method of producing a metal form containing dispersed aerogel particles impregnated with polymers.
Figure 5B:
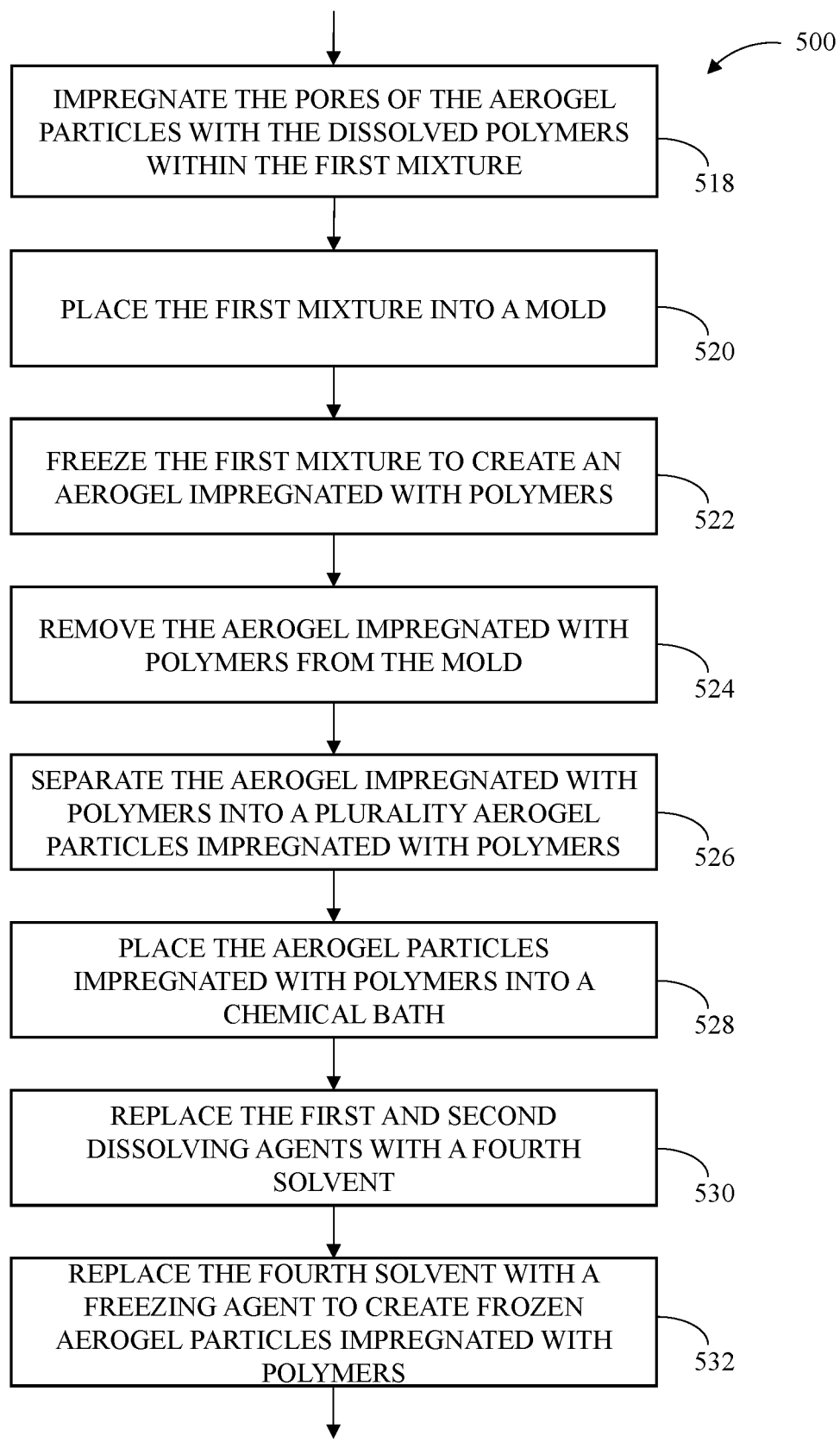
FIG. 5b is the continued flow chart from FIG. 5a showing another embodiment of the method of producing the metal form containing dispersed aerogel particles impregnated with polymers.
Figure 5D:
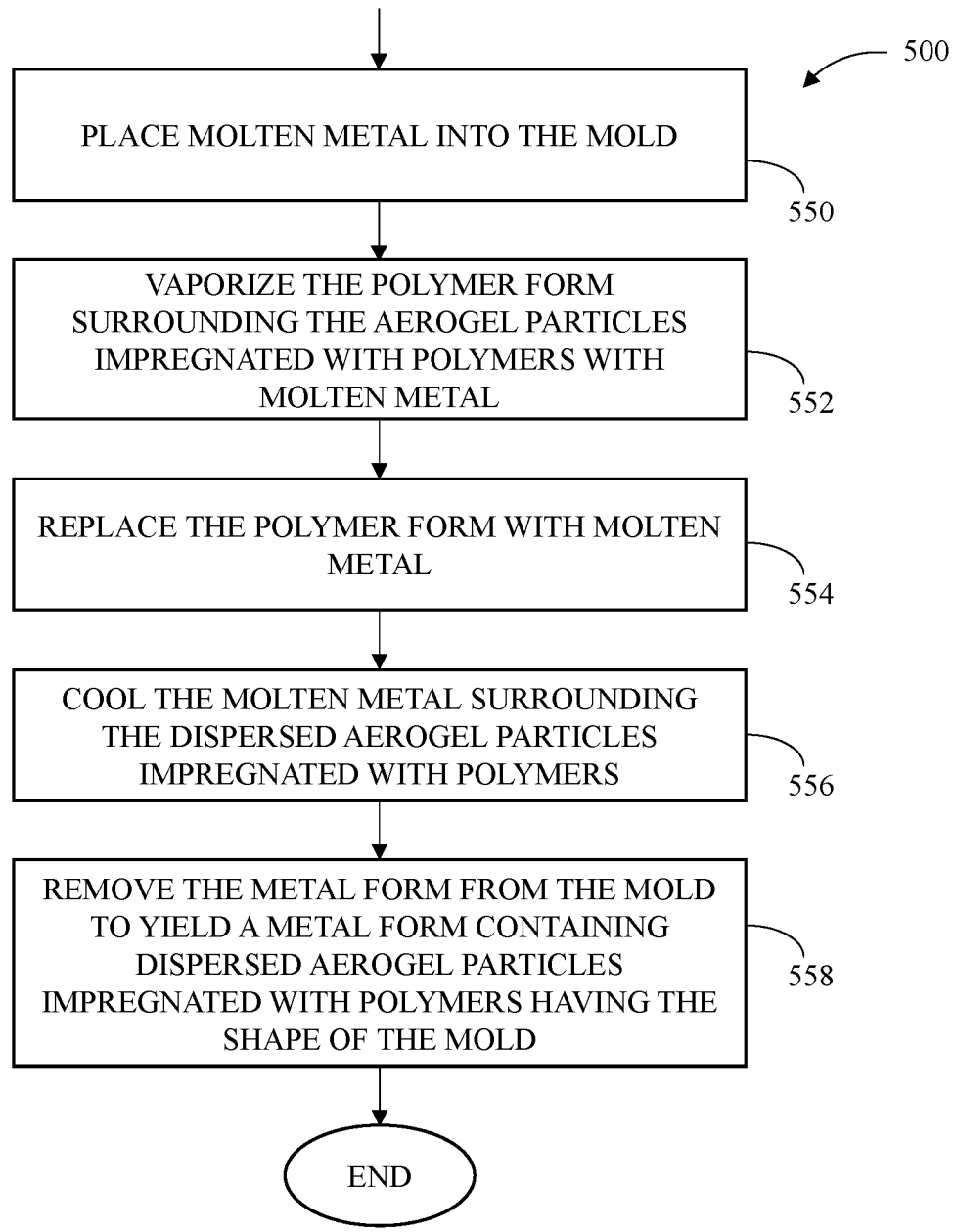
FIG. 5d is the continued flow chart from FIG. 5c showing another embodiment of the method of producing the metal form containing dispersed aerogel particles impregnated with polymers.

Method 400, shown in FIG. 4, illustrates a method of producing a metal form containing dispersed aerogel particles. Method 400 starts with step 402 beginning with creating a mixture of polymers and aerogel particles. Method 400 then continues to step 404.

During step 404, the mixture of polymers and aerogel particles is placed into a mold. During step 406, the mixture is frozen within the mold creating a polymer form containing dispersed aerogel particles. The mixture may be frozen by placing the mixture of polymers and aerogel particles within a pressure chamber and by lowering the temperature within the pressure chamber. The method 400 then continues to step 408.

During step 408, molten metal is placed into the mold. The metal used may be a molten form of one or more of boron, silicon, germanium, arsenic, antimony, tellurium, polonium, lithium, sodium, potassium, rubidium, cesium, francium, beryllium, magnesium, calcium, strontium, barium, radium, aluminum, scandium, titanium, vanadium, chromium, manganese, iron, cobalt, nickel, copper, zinc, gallium, yttrium, zirconium, niobium, molybdenum, technetium, ruthenium, rhodium, palladium, silver, cadmium, indium, tin, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth, actinium, thorium, protactinium, uranium, neptunium, plutonium, americium, curium, berkelium, californium, einsteinium, fermium, mendelevium, nobelium, lawrencium, and transactinide metals. Once the molten metal is placed in the mold the method 400 continues to step 410.

During step 410, the molten metal begins to vaporize the polymer form without damaging the aerogel particles. The aerogel particles dispersed throughout the polymer form remain in place while the molten metal vaporizes the polymer form. During step 412, the molten metal replaces the polymer form after being completely vaporized. The molten metal takes the place of the polymer form and the dispersed aerogel particles continue to remain in the desired location. Once the polymer form is replaced with molten metal, a metal form containing dispersed aerogel particles is created.

The method 400 continues to step 414 where the metal form is cooled so that the metal may harden and form a solid metal form. During step 416, the metal form is removed from the mold which yields a metal form containing dispersed aerogel particles having the shape of the mold. This ends the method 400 by creating the desired end result of the metal form containing dispersed aerogel particles.

Method 500, shown in FIGS. 5a, 5b, 5c, and 5d, illustrates another embodiment of a method of producing a metal form containing dispersed aerogel particles impregnated with polymers which begins at step 502 with creating a homogenous mixture. The homogenous mixture starts the process of creating aerogel particles. The homogenous mixture is comprised of one or more solvents which may be selected from the following: methyltrimethoxysilane, hexadecyl trimethyl ammonium bromide, deionized water, ketone, aldehyde, alkyl alkanoate, formamide, /V-methylpyrrolidone, dimethyl sulfoxide, aliphatic halogenated hydrocarbons, cycloaliphatic halogenated hydrocarbons, halogenated aromatic compounds, fluorinated ethers, acetaldehyde, propionaldehyde, n-butyraldehyde, isobutyraldehyde, 2-ethylbutyraldehyde, valeraldehyde, isopentaldehyde, 2-methylpentaldehyde, 2-ethylhexaldehyde, acrolein, methanol, ethanol, propanol, isopropanol, butanol, sec-butanol, ferf-butanol, pentanol, neopentanol, amyl alcohol, acetone, methylethyl, acetonitrile, dimethylacetamide, N,N'-dimethylformamide, dimethylsulfoxide, ethyl acetate, amyl acetate, cyclohexanol, cyclohexane, pentane, hexane, heptane, alcohols, pyrrolidones, and other appropriate solvents. Upon mixing three of the above listed solvents together, the mixture is mixed under vigorous stirring until the mixture is homogenous creating a homogenous mixture. Once the homogeneous mixture is created, the process moves to Step 504.

Step 504 consists of stirring a catalyst into the homogenous mixture in order to produce a liquid containing solid nanoparticles. The catalyst activates one or more of the solvents within the homogenous mixture to create solid nanoparticles suspended in the homogeneous mixture. The catalyst may be selected from a group comprising of primary amines, secondary amines, tertiary amines, triazine derivatives, organometallic compounds, metal chelates, quaternary ammonium salts, ammonium hydroxides, alkali metals, alkaline earth metal hydroxides, alkoxides, and carboxylates. Once the catalyst is added and stirred into the homogenous mixture then method 500 moves to step 506.

During step 506, a hydrocarbon is added to the homogenous mixture in order to create an emulsion. An emulsion, as used herein, is defined as a mixture containing more than one liquid. The hydrocarbon may be one of hexane, acetone, acetonitrile, acetic acid, amyl alcohol, benzene, carbon tetrachloride, chlorobenzene, chloroform, cyclo-cresylic acid, hexane, isopropyl alcohol, di-methyl formamide, ethanol, ethyl acetate, furfural, furfural alcohol, methanol, N-butane, N-heptane, N-hexane, and pyridine. Once the emulsion is created, the method 500 continues to step 508.

During step 508, the emulsion is stirred until gelation occurs. Gelation, as used herein, is defined as solidification by freezing. The emulsion may be subjected to low temperatures to promote gelation or gelation may occur through chemical reactions taking place within the homogenous mixture. Once gelation occurs, the method continues to step 510.

During step 510, a first dissolving agent is used to remove the hydrocarbon from the emulsion. Removing the hydrocarbon from the emulsion leaves the created aerogel particles which contain pores. The first dissolving agent may be one of acetonitrile, 2-methoxyethanol, (2, 6, 10, 14)-tetramethyl pentadecane, acetone, alcohols, amyl alcohol, amylacetate, aniline, N-butanol, N-butanol, sec-butanol, ie/t-butanol, chlorex, cyclohexanol, C1-C6 alcohols cyclohexanone, cresylic acid, dimethylsulfoxide, Dimethylacetamide, dimethylformamide, N,N'-dimethylformamide, ethanol, furfural, furfural alcohol, ft-propanol, pyridine, hexane, hexanes, N-hexane, hydrocarbons, isopropanol, isopropanol, methanol, methoxyethanol, N-Methylpyrollidone, nitrobenzene, pentanol, liquid SO2, quinolone, and xylene. Once the hydrocarbon is removed, the method continues to step 512.

During step 512, a polymer is placed within a second dissolving agent to dissolve the polymer creating a dissolved polymer. The polymer may be one of polyester, polyethylene, terephthalate, polyolefin, polyacrylic acid, polymethylacrylate, expoxy, polymethyl methacrylate, acrylonitrile butadiene styrene, polyimides, polyamides, polycaprolactam, polylactic acid, polybenzimidazole, polycarbonate, polyether sulfone, polyetherether ketone, polyetherimide, polyethylene, medium-density polyethylene, low-density polyethylene, polyphenylene oxide, polyphenylene sulfide, polypropylene, polystyrene, polyvinyl chloride, and polytetrafluoroethylene. The second dissolving agent may be similar to the first dissolving agent or may be selected from one of acetonitrile, 2-methoxyethanol, (2, 6, 10, 14)-tetramethyl pentadecane, acetone, alcohols, amyl alcohol, amylacetate, aniline, N-butanol, N-butanol, sec-butanol, ie/t-butanol, chlorex, cyclohexanol, C1-C6 alcohols cyclohexanone, cresylic acid, dimethylsulfoxide, dimethylacetamide, dimethylformamide, N,N'-dimethylformamide, ethanol, furfural, furfural alcohol, ft-propanol, pyridine, hexane, hexanes, N-hexane, hydrocarbons, isopropanol, isopropanol, methanol, methoxyethanol, N-Methylpyrollidone, nitrobenzene, pentanol, liquid SO2, quinolone, and xylene. Once the dissolved polymer is created, the method moves to step 514.

During step 514, the aerogel particles are mixed with an alcohol and the dissolved polymer and then the mixture is mixed under vigorous stirring to create a first mixture. The alcohol may be one of ethanol, acetone, methanol, acetonitrile, acetic acid, amyl alcohol, benzene, carbon tetrachloride, chlorobenzene, chloroform, cyclo-cresylic acid, hexane, isopropyl alcohol, di-methyl formamide, ethanol, ethyl acetate, furfural, furfural alcohol, methanol, N-butane, N-heptane, N-hexane, and pyridine. Upon creating the first mixture, method 500 proceeds to step 516. The aerogel particles may be produced from the previous steps or created from other known methods within the art.

During step 516, the pores of the aerogel particles are dilated within the first mixture. The process of dilating the pores of the aerogel particles may be completed in a number of ways such as by increasing the temperature or the pressure of the aerogel particles. In this method, the aerogel particles may be placed within a pressure chamber so that the aerogel particles are subjected to high temperature and increased pressure in order to dilate the pores of the aerogel particles. Once the pores of the aerogel particles are dilated, the method 500 moves to step 518.

During step 518, the aerogel particles having dilated pores are impregnated with the dissolved polymers within the first mixture creating aerogel particles impregnated with polymers. This step may take place within a pressure vessel where the temperature and pressure within the vessel is increased in order to allow the polymers to enter the pores of the aerogel particles, thereby impregnating the aerogel particles with polymers. Once the impregnation step is completed then the method 500 continues to step 520.

During step 520, the first mixture containing the aerogel particles impregnated with polymers is placed into a first mold. The mold may be of any shape or design suitable for the entire contents of the first mixture. The method continues to step 522.

During step 522, the first mixture is subjected to low temperatures to induce freezing. The temperature may be variable depending on the solvents and polymers used within the first mixture. Freezing the first mixture creates a solid form comprising an aerogel impregnated with polymers. This step may be completed within a pressure chamber by lowering the temperature within the pressure chamber in order to freeze the first mixture. Once the aerogel impregnated with polymers is frozen solid then the method 500 continues to step 524.

During step 524, the aerogel impregnated with polymers is removed from the first mold and are separated into many aerogel particles impregnated with polymers in step 526. The aerogel particles impregnated with polymers may optionally be mixed with filler material. The filler material may comprise graphene, graphene oxide, carbon nanotubes, cellulose nanocrystals as well as other two and three dimensional materials. In step 528, the aerogel particles impregnated with polymers are placed into a chemical bath. The chemical bath works as a cleaning agent and the chemicals used may be selected from one or more of hexane, acetone, acetonitrile, acetic acid, amyl alcohol, benzene, carbon tetrachloride, chlorobenzene, chloroform, cyclo-cresylic acid, hexane, isopropyl alcohol, di-methyl formamide, ethanol, ethyl acetate, furfural, furfural alcohol, methanol, N-butane, N-heptane, N-hexane, and pyridine. Once the aerogel particles impregnated with polymers are placed in the chemical bath, the method 500 continues to step 530.

During step 530, the first and second dissolving agents dispersed throughout the aerogel particles impregnated with polymers are replaced with a fourth solvent. The process of replacing may be completed through solvent exchange which allows the fourth solvent to replace a different solvent, in this case the dissolving agents, which is miscible with the fourth solvent. The step of replacing the first and second dissolving agents with a fourth solvent may be completed within a pressure chamber. This may be conducted by flushing the pressure chamber, while the aerogel particles impregnated with polymers are within the pressure chamber, with the fourth solvent in order to remove the first and second dissolving agents and leave the fourth solvent within the aerogel particles, thereby exchanging the first and second dissolving agents with the fourth solvent. The fourth solvent may be selected from one of one or more of hexane, acetone, acetonitrile, acetic acid, amyl alcohol, benzene, carbon tetrachloride, chlorobenzene, chloroform, cyclo-cresylic acid, hexane, isopropyl alcohol, di-methyl formamide, ethanol, ethyl acetate, furfural, furfural alcohol, methanol, N-butane, N-heptane, N-hexane, and pyridine. Then during step 532, the fourth solvent is replaced with a freezing agent through another solvent exchange process because the freezing agent and fourth solvent are miscible with one another. By replacing the fourth solvent with a freezing agent, the aerogel particles impregnated with polymers are frozen creating frozen aerogel particles impregnated with polymers. The freezing agent may be selected from liquid carbon dioxide, supercritical carbon dioxide, nitrous oxide, and supercritical dihydrogen monoxide.

During step 534, the frozen aerogel particles impregnated with polymers are sublimed. This creates sublimed aerogel particles impregnated with polymers and ends step 534, thus moving method 500 to step 536.

During step 536, a second polymer is placed in a third dissolving agent in order to create a second dissolved polymer. The second polymer may be selected from one of polyester, polyethylene, terephthalate, polyolefin, polyacrylic acid, polymethylacrylate, expoxy, polymethyl methacrylate, acrylonitrile butadiene styrene, polyimides, polyamides, polycaprolactam, polylactic acid, polybenzimidazole, polycarbonate, polyether sulfone, polyetherether ketone, polyetherimide, polyethylene, polyphenylene oxide, polyphenylene sulfide, polypropylene, polystyrene, polyvinyl chloride, and polytetrafluoroethylene. The third dissolving agent may be similar to the first or second dissolving agent or may be entirely new selected from one of methyltrimethoxysilane, hexadecyl trimethyl ammonium bromide, deionized water, ketone, aldehyde, alkyl alkanoate, formamide, /V-methylpyrrolidone, dimethyl sulfoxide, aliphatic halogenated hydrocarbons, cycloaliphatic halogenated hydrocarbons, halogenated aromatic compounds, fluorinated ethers, acetaldehyde, propionaldehyde, n-butyraldehyde, isobutyraldehyde, 2-ethylbutyraldehyde, valeraldehyde, isopentaldehyde, 2-methylpentaldehyde, 2-ethylhexaldehyde, acrolein, methanol, ethanol, propanol, isopropanol, butanol, sec-butanol, ferf-butanol, pentanol, neopentanol, amyl alcohol, acetone, methylethyl, acetonitrile, dimethylacetamide, N,N'-dimethylformamide, dimethylsulfoxide, ethyl acetate, amyl acetate, cyclohexanol, cyclohexane, pentane, hexane, heptane, alcohols, and pyrolidones. Step 536 ends and the method 500 continues to step 538.

During step 538, the sublimed aerogel particles impregnated with polymers are mixed with the second dissolved polymer to create a second mixture. The method 500 continues to step 538.

During step 540, the second mixture is placed into a second mold in order to form a shaped mixture. In step 542, the third dissolving agent is exchanged with a freezing agent. The freezing agent may be selected from one of liquid carbon dioxide, supercritical carbon dioxide, nitrous oxide, and supercritical dihydrogen monoxide. The process of exchanging may take place within a pressure vessel similar to step 530. This may be completed by flushing the pressure vessel with a freezing agent, thereby replacing the third dissolving agent with the freezing agent. Once step 542 is complete, the method 500 continues to step 544.

During step 544, the shaped mixture is frozen creating a polymer form containing dispersed aerogel particles impregnated with polymers. The aerogel particles impregnated with polymers were dispersed throughout the shaped mixture and surrounded the second dissolved polymer. When then shaped mixture is frozen the second dissolved polymer freezes and surrounds the dispersed aerogel particles impregnated with polymers creating a polymer form containing dispersed aerogel particles impregnated with polymers. Once the polymer form containing dispersed aerogel particles impregnated with polymers is frozen the method 500 continues to step 546.

During step 546, the polymer form containing dispersed aerogel particles impregnated with polymers is removed from the second mold and placed into a third mold with the desired shape of the final product. The third mold may be the same shape as the second mold or the third mold may be larger than the second mold. During step 548, a refractory material is placed around the polymer form containing dispersed aerogel particles impregnated with polymers. The method 500 continues to step 550 after the refractory material is placed around the polymer form.

During step 550, molten metal is placed into the third mold. The metal used may be a molten form of one or more of boron, silicon, germanium, arsenic, antimony, tellurium, polonium, lithium, sodium, potassium, rubidium, cesium, francium, beryllium, magnesium, calcium, strontium, barium, radium, aluminum, scandium, titanium, vanadium, chromium, manganese, iron, cobalt, nickel, copper, zinc, gallium, yttrium, zirconium, niobium, molybdenum, technetium, ruthenium, rhodium, palladium, silver, cadmium, indium, tin, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth, actinium, thorium, protactinium, uranium, neptunium, plutonium, americium, curium, berkelium, californium, einsteinium, fermium, mendelevium, nobelium, lawrencium, and transactinide metals. Once the molten metal is placed in the third mold, the method 500 continues to step 552.

During step 552, the molten metal begins to vaporize the polymer form without damaging the aerogel particles impregnated with polymers. The aerogel particles dispersed throughout the polymer form remain in place while the molten metal vaporizes the polymer form. During step 554, the molten metal replaces the polymer form after being completely vaporized. The molten metal takes the place of the polymer form and the dispersed aerogel particles continue to remain in the desired location. Once the polymer form is replaced with molten metal, a metal form containing dispersed aerogel particles impregnated with polymers is created.

The method 500 continues to step 556 where the metal form is cooled so that the metal may harden and form a solid metal form. During step 558, the metal form is removed from the third mold which yields a metal form containing dispersed aerogel particles impregnated with polymers having the shape of the third mold. The process of cooling the molten metal form may be completed within a pressure vessel by lowering the temperature within the pressure vessel. This ends the method 500 by creating the desired end result of the metal form containing dispersed aerogel particles impregnated with polymers.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:

1. A method of producing a metal form containing dispersed aerogel particles impregnated with polymers, said method comprising the steps of;
   (a) mixing at least one first solvent and a catalyst to produce a homogeneous mixture,
   (b) mixing the liquid containing solid nanoparticles with a hydrocarbon to create an emulsion,
   (c) stirring the emulsion until gelation occurs,
   (d) removing the emulsifying solvent from the emulsion with a first dissolving agent to produce a plurality of aerogel particles containing pores,
   (e) dissolving a first polymer in a second dissolving agent to create a first dissolved polymer,
   (f) mixing the plurality of aerogel particles with an alcohol and the first dissolved polymer to produce a first mixture,
   (g) dilating the pores of the aerogel particles within the first mixture,
   (h) placing the first mixture into a first mold,
   (i) impregnating the aerogel particles within the first mixture with a second polymer,
   (j) freezing the first mixture within the first mold creating a solid form,
   (k) removing the solid form from the first mold,
   (l) separating the solid form into a plurality of solid particles,
   (m) placing the plurality of solid particles into a chemical bath,
   (n) replacing the first and second dissolving agent within the solid particles with a second solvent,
   (o) replacing at least a portion of the second solvent from the solid particles with a freezing agent to create frozen solid particles,
   (p) subliming the frozen solid particles to create sublimed solid particles,
   (q) dissolving a third polymer in a third dissolving agent to create a second dissolved polymer,
   (r) mixing the sublimed solid particles with the second dissolved polymer to produce a second mixture,
   (s) placing the second mixture into a second mold to form a shaped mixture,
   (t) exchanging the third dissolving agent from the shaped mixture with the freezing agent,
   (u) freezing the shaped mixture creating a polymer form containing dispersed aerogel particles,
   (v) placing the polymer form containing dispersed aerogel particles into a third mold,
   (w) placing a refractory material around the polymer form containing dispersed aerogel particles within the third mold,
   (x) pouring molten metal into the third mold,
   (y) vaporizing the polymer form after step (x),
   the molten metal creating a metal form containing dispersed aerogel particles impregnated with the second polymer,
   and
   (z) removing the metal form containing dispersed aerogel particles impregnated with the second polymer from the third mold, the metal form containing dispersed aerogel particles impregnated with the second polymer having the shape of the third mold.

2. The method of claim 1, wherein the solvents are selected from the group consisting of the following components: methyltrimethoxysilane, hexadecyl trimethyl ammonium bromide, deionized water, ketone, aldehyde, alkyl alkanoate, formamide, n-methylpyrrolidone, dimethyl sulfoxide, aliphatic halogenated hydrocarbons, cycloaliphatic halogenated hydrocarbons, halogenated aromatic compounds, fluorinated ethers, acetaldehyde, propionaldehyde, n-butyraldehyde, isobutyraldehyde, 2-ethylbutyraldehyde, valeraldehyde, isopentaldehyde, 2-methylpentaldehyde, 2-ethylhexaldehyde, acrolein, methanol, ethanol, propanol, isopropanol, butanol, sec-butanol, tert-butanol, pentanol, neopentanol, amyl alcohol, acetone, methylethyl, acetonitrile, dimethylacetamide, N,N-dimethylformamide, dimethylsulfoxide, ethyl acetate, amyl acetate, cyclohexanol, cyclohexane, pentane, hexane, heptane, alcohols, and pyrrolidones.

3. The method of claim 2, wherein the solvents include at least three of the components.

4. The method of claim 1, wherein the polymers are selected from the group consisting of polyester, polyethylene, terephthalate, polyolefin, polyacrylic acid, polymethylacrylate, epoxy polymers, polymethyl methacrylate, acrylonitrile butadiene styrene, polyimides, polyamides, polycaprolactam, polylactic acid, polybenzimidazole, polycarbonate, polyether sulfone, polyetherether ketone, polyetherimide, polyethylene, polyphenylene oxide, polyphenylene sulfide, polypropylene, polystyrene, polyvinyl chloride, and polytetrafluoroethylene.

5. The method of claim 1, wherein the catalyst is selected from a group comprising of primary amines, secondary amines, tertiary amines, triazine derivatives, organometallic compounds, metal chelates, quaternary ammonium salts, ammonium hydroxides, alkali metals, alkaline earth metal hydroxides, alkoxides, and carboxylates.

6. The method of claim 1, wherein the hydrocarbon emulsifying solvent is selected from the group consisting of: hexane, acetone, acetonitrile, acetic acid, amyl alcohol, benzene, carbon tetrachloride, chlorobenzene, chloroform, cresylic acid, isopropyl alcohol, di-methyl formamide, ethanol, ethyl acetate, furfural, furfural alcohol, methanol, N-butane, N-heptane, N-hexane, and pyridine.

7. The method of claim 1, wherein the chemical bath includes at least one of hexane, acetone, acetonitrile, acetic acid, amyl alcohol, benzene, carbon tetrachloride, chlorobenzene, chloroform, cyclo-cresylic acid, isopropyl alcohol, di-methyl formamide, ethanol, ethyl acetate, furfural, furfural alcohol, methanol, N-butane, N-heptane, N-hexane, and pyridine.

8. The method of claim 1, wherein the dissolving agents are selected from the group consisting of acetonitrile, 2-methoxyethanol, (2, 6, 10, 14)-tetramethyl pentadecane, acetone, alcohols, amyl alcohol, amylacetate, aniline, N-butanol, sec-butanol, tert-butanol, cyclohexanol, C1-C6 alcohols cyclohexanone, cresylic acid, dimethylsulfoxide, dimethylacetamide, dimethylformamide, N,N-dimethylformamide, ethanol, furfural, furfural alcohol, propanol, pyridine, hexane, N-hexane, hydrocarbons, isopropanol, methanol, methoxyethanol, N-Methylpyrrolidone, nitrobenzene, pentanol, liquid sulfur dioxide, quinoline, water, and xylene.

9. The method of claim 1, wherein the dissolving agents are different from one another.

10. The method of claim 1, wherein the solvent is selected from the group consisting of acetone, ethanol, methanol, acetonitrile, acetic acid, amyl alcohol, benzene, carbon tetrachloride, chlorobenzene, chloroform, cresylic acid, hexane, isopropyl alcohol, di-methyl formamide, ethanol, ethyl acetate, furfural, furfural alcohol, methanol, N-butane, N-heptane, N-hexane, and pyridine.

11. The method of claim 1, wherein the freezing agent is selected from the group consisting of liquid carbon dioxide, supercritical carbon dioxide, nitrous oxide, and supercritical dihydrogen monooxide.

12. The method of claim 1, wherein the alcohol is selected from the group consisting of ethanol, acetone, methanol, acetonitrile, acetic acid, amyl alcohol, benzene, carbon tetrachloride, chlorobenzene, chloroform, cyclo-cresylic acid, hexane, isopropyl alcohol, di-methyl formamide, ethanol, ethyl acetate, furfural, furfural alcohol, methanol, N-butane, N-heptane, N-hexane, and pyridine.

13. The method of claim 1, wherein the metal is selected from the group consisting of boron, silicon, germanium, arsenic, antimony, tellurium, polonium, lithium, sodium, potassium, rubidium, cesium, francium, beryllium, magnesium, calcium, strontium, barium, radium, aluminum, scandium, titanium, vanadium, chromium, manganese, iron, cobalt, nickel, copper, zinc, gallium, yttrium, zirconium, niobium, molybdenum, technetium, ruthenium, rhodium, palladium, silver, cadmium, indium, tin, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, thallium, lead, bismuth, actinium, thorium, protactinium, uranium, neptunium, plutonium, americium, curium, berkelium, californium, einsteinium, fermium, mendelevium, nobelium, lawrencium, and transactinide metals.

* * * * *